(12) United States Patent
Collart

(10) Patent No.: US 11,580,243 B2
(45) Date of Patent: *Feb. 14, 2023

(54) SYSTEM FOR AUTHORIZING RENDERING OF OBJECTS IN THREE-DIMENSIONAL SPACES

(71) Applicant: Todd Collart, Los Altos, CA (US)

(72) Inventor: Todd Collart, Los Altos, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/096,832

(22) Filed: Nov. 12, 2020

(65) Prior Publication Data

US 2021/0064774 A1    Mar. 4, 2021

Related U.S. Application Data

(63) Continuation of application No. 16/145,325, filed on Sep. 28, 2018, now Pat. No. 10,867,061.

(51) Int. Cl.
*G06F 21/62* (2013.01)
*G06T 19/20* (2011.01)
(Continued)

(52) U.S. Cl.
CPC ........ *G06F 21/6218* (2013.01); *G06F 21/604* (2013.01); *G06Q 50/184* (2013.01);
(Continued)

(58) Field of Classification Search
CPC ........ G06F 21/60; G06F 21/604; G06F 21/62; G06F 21/6209; G06F 21/6218; G06F 21/6227; G06F 21/6245; G06F 21/6263; G06F 3/013; H04L 63/10; H04L 63/101; H04L 63/102; H04L 63/104; H04L 63/105; H04L 63/107; H04L 63/108; G06Q 50/184; G06T 19/20; G06T 2219/2004
See application file for complete search history.

(56) References Cited

U.S. PATENT DOCUMENTS 10,417,613 B1   9/2019   Brisebois
10,740,804 B2   8/2020   Spivack et al.
(Continued)

OTHER PUBLICATIONS

Augtech Systems Ltd; "Bubbled: What is the land multiplier for?"; https://www.bubbled.io/faq/#what-is-the-land-multiplier-for; 2017; 6 pages.

(Continued)

*Primary Examiner* — Malcolm Cribbs
(74) *Attorney, Agent, or Firm* — Fitch, Even, Tabin & Flannery LLP

(57) ABSTRACT

Systems and methods for authorizing rendering of objects in three-dimensional spaces are described. The system may include a first system defining a virtual three-dimensional space including the placement of a plurality of objects in the three-dimensional space, and a second system including a plurality of rules associated with portions of the three-dimensional space and a device coupled to the first system and the second system. The device may receive a request to render a volume of three-dimensional space, retrieve objects for the volume of three-dimensional, retrieve rules associated with the three-dimensional, and apply the rules for the three-dimensional space to the objects.

20 Claims, 18 Drawing Sheets

(51) Int. Cl.
*G06Q 50/18* (2012.01)
*G06F 21/60* (2013.01)
*G06F 3/01* (2006.01)

(52) U.S. Cl.
CPC .............. *G06T 19/20* (2013.01); *G06F 3/013* (2013.01); *G06T 2219/2004* (2013.01)

(56) References Cited

U.S. PATENT DOCUMENTS

| | | | |
|---|---|---|---|
| 2002/0082942 A1* | 6/2002 | Shimazu | G06F 16/954 705/27.2 |
| 2004/0068502 A1 | 4/2004 | Vogedes | |
| 2007/0094716 A1 | 4/2007 | Farino | |
| 2011/0010675 A1 | 1/2011 | Hamilton, II | |
| 2013/0083011 A1 | 4/2013 | Geisner | |
| 2013/0083173 A1 | 4/2013 | Geisner | |
| 2013/0120369 A1 | 5/2013 | Miller | |
| 2013/0173314 A1* | 7/2013 | Webb | G06Q 10/02 705/5 |
| 2014/0058959 A1* | 2/2014 | Isbjornssund | B33Y 50/00 705/310 |
| 2014/0283104 A1 | 9/2014 | Nilsson | |
| 2015/0130788 A1 | 5/2015 | Bailiang | |
| 2016/0049013 A1 | 2/2016 | Tosas Bautista | |
| 2016/0267759 A1 | 9/2016 | Kerzner | |
| 2017/0046882 A1 | 2/2017 | Lane | |
| 2017/0316186 A1 | 11/2017 | Breitenfeld | |
| 2018/0001198 A1 | 1/2018 | Frappiea | |
| 2018/0060948 A1 | 3/2018 | Mattingly | |
| 2018/0061138 A1 | 3/2018 | Neeter | |
| 2018/0075656 A1 | 3/2018 | Kim | |
| 2018/0158053 A1 | 6/2018 | Adams | |
| 2018/0357833 A1 | 12/2018 | Biganski | |
| 2019/0108580 A1* | 4/2019 | Spivack | G06Q 30/06 |
| 2019/0156558 A1 | 5/2019 | Neeter | |
| 2019/0289084 A1 | 9/2019 | Duan | |
| 2019/0340833 A1 | 11/2019 | Furtwangler | |
| 2019/0379671 A1 | 12/2019 | Sundar | |
| 2020/0097077 A1 | 3/2020 | Nguyen | |
| 2020/0104522 A1 | 4/2020 | Collart | |

OTHER PUBLICATIONS

Collart; U.S. Appl. No. 16/145,325, filed Sep. 28, 2018.
GitHub; "Arcona White Paper #2"; https://github.com/ArconaEcosystem/arcona-system/issues/2; Oct. 29, 2017.
PiligrimXXI Team; "Arcona augmented reality ecosystem"; Nov. 27, 2017; 44 pages.
USPTO; Non-Final Office Action issued in U.S. Appl. No. 16/145,325 dated May 20, 2020.
USPTO; Examiner Interview Summary issued in U.S. Appl. No. 16/145,325 dated Aug. 13, 2020.
USPTO; Notice of Allowance issued in U.S. Appl. No. 16/145,325 dated Aug. 13, 2020.

* cited by examiner

SYSTEM FOR AUTHORIZING RENDERING OF OBJECTS IN THREE-DIMENSIONAL SPACES

This application is a continuation of U.S. application Ser. No. 16/145,325, filed Sep. 28, 2018, for SYSTEM FOR AUTHORIZING RENDERING OF OBJECTS IN THREE-DIMENSIONAL SPACES, which is incorporated in its entirety herein by reference.

BACKGROUND OF THE INVENTION

1. Field of the Invention

The present invention relates generally to extended reality experiences, and more specifically to registration and authorization for extended reality experiences.

2. Discussion of the Related Art

The early days of the Internet resembled a "wild west" situation with little oversight and few rules. For example, in the case of domain names, anyone could register any domain, thus the need for a common domain name service or DNS. Similarly, there was no common "lookup" location for companies. Thus, the concept of a physical yellow pages then evolved into an online yellow pages with search engines. And of course, domain "squatters" would reserve domains even for companies that had trademarked certain names, thus forcing these companies to pay significant fees to access the domains using the names they had legally trademarked.

With the advent of virtual reality (VR), augmented reality (AR), and mixed reality (MR) experiences, a similar wild west situation may emerge that is even more complex, as such experiences may persist in the real world across space, time, users and devices. As the concept of "sharing" experiences between individuals becomes central to society, the ability to manage and control "sharing" will play an even more important role in the combined physical/virtual experiences of the future.

The lack of such a system and associated governance, rules, or compliance may result in a world where such new technologies can be used in ways that are adversarial, damaging, and potentially illegal. For example, a person may try to own and sell the virtual "rights" associated with your personal property, overlay hurtful messages over a loved one as they walk down the street, or create a virtual pornographic experience in a public school setting. If some form of policies, rules and governance are not put in place, several negative situations may occur ranging from conflict in personal "ownership" rights to inaccurate and possibly dangerous experiences.

SUMMARY

A method of authorizing rendering of objects is described. The method may include authorizing objects to be rendered in three-dimensional spaces with a first system defining a virtual three-dimensional space including the placement of a plurality of objects in the three-dimensional space, the system comprising a second system defining said virtual three-dimensional space including a plurality of rules associated with portions of the three-dimensional space, and a device coupled to the first system and the second system, the method comprising: receiving a request to render a volume of three-dimensional space, retrieving one or more objects for said volume of three-dimensional space of said plurality of objects from said first system, retrieving one or more rules of said plurality of rules associated with portions of the three-dimensional space included in said volume of three-dimensional space, and applying said one or more rules for said portions of three-dimensional space to all said one or more objects corresponding to said portions of three-dimensional space.

A system for authorizing rendering of objects in three-dimensional spaces is described. The system may include a first system defining a virtual three-dimensional space including the placement of a plurality of objects in the three-dimensional space, the system further comprising a second system defining said virtual three-dimensional space including a plurality of rules associated with portions of the three-dimensional space and a device coupled to the first system and the second system, the device configured to perform the steps of receive a request to render a volume of three-dimensional space, retrieve one or more objects for said volume of three-dimensional space of said plurality of objects from said first system, retrieve one or more rules of said plurality of rules associated with portions of the three-dimensional space included in said volume of three-dimensional space, and apply said one or more rules for said portions of three-dimensional space to all said one or more objects corresponding to said portions of three-dimensional space.

A non-transitory computer readable medium storing code is described, the code configured to authorize rendering of objects in three-dimensional spaces with a first system defining a virtual three-dimensional space including the placement of a plurality of objects in the three-dimensional space, the system comprising a second system defining said virtual three-dimensional space including a plurality of rules associated with portions of the three-dimensional space, and a device coupled to the first system and the second system, the code comprising instructions executable by a processor to receive a request to render a volume of three-dimensional space, retrieve one or more objects for said volume of three-dimensional space of said plurality of objects from said first system, retrieve one or more rules of said plurality of rules associated with portions of the three-dimensional space included in said volume of three-dimensional space, and apply said one or more rules for said portions of three-dimensional space to all said one or more objects corresponding to said portions of three-dimensional space.

Some examples of the method, system, and non-transitory computer-readable medium described above may further include deactivating any of said one or more objects that do not satisfy said one or more rules when said one or more rules are applied. Some examples of the method, system, and non-transitory computer-readable medium described above may further include activating any of said one or more objects that do satisfy said one or more rules when said one or more rules are applied.

In some examples of the method, system, and non-transitory computer-readable medium described above, said volume of three-dimensional space includes at least one selected from the group of a person, an animal, a physical location, and an inanimate object. In some examples of the method, system, and non-transitory computer-readable medium described above, said plurality of rules includes at least one selected from the group of a government rule, a regulation rule, a zoning rule, a law rule, a compliance rule, a government rights rule, and an ordinance rule.

In some examples of the method, system, and non-transitory computer-readable medium described above, said plurality of rules are configured to include a time of day schedule defining when at least one of said plurality of rules is applicable and/or inapplicable. In some examples of the method, system, and non-transitory computer-readable medium described above, said plurality of rules are configured to include a user profile defining whether at least one of said plurality of rules is applicable to at least one of said users.

In some examples of the method, system, and non-transitory computer-readable medium described above, said plurality of rules are configured to include at least one prior user characteristic defining when each of said plurality of rules is applicable based on one or more prior users accessing said volume of three-dimensional space. In some examples of the method, system, and non-transitory computer-readable medium described above, said plurality of rules are configured to include simultaneous viewing user characteristic defining when each of said plurality of rules is applicable based on other users who have access to or can affect said volume of three-dimensional space.

In some examples of the method, system, and non-transitory computer-readable medium described above, the rendering comprises one or more of display, audio, smell, touch or taste. In some examples of the method, system, and non-transitory computer-readable medium described above, said receiving a request to render a volume of three-dimensional space also includes receiving an orientation to said volume of three-dimensional space wherein said orientation includes at least one selected from the group of a proximity distance, a position, a placement, a perimeter, a field of view, a viewing angle, a relative velocity, a viewing validity, and a viewing time.

In some examples of the method, system, and non-transitory computer-readable medium described above, said plurality of rules utilize said orientation to said volume of three-dimensional space. In some examples of the method, system, and non-transitory computer-readable medium described above, said plurality of rules includes rules for assigning a defined volume of three-dimensional space to an owner.

In some examples of the method, system, and non-transitory computer-readable medium described above, said plurality of rules includes rules for the owned volume of space wherein the rules for the owned volume of space are determined by the owner of the volume. In some examples of the method, system, and non-transitory computer-readable medium described above, said plurality of rules includes rules allowing the owner to enter into an agreement with another entity wherein the agreement includes allowing the entity to have at least partial control of a portion of the three-dimensional space wherein said entity includes at least one selected from the group of a person, a group of persons, a government entity, and a business.

In some examples of the method, system, and non-transitory computer-readable medium described above, the plurality of rules includes rules governing the at least the partial control of the portion of three-dimensional space. In some examples of the method, system, and non-transitory computer-readable medium described above, the plurality of rules includes rules set by the owner determining the extent of the partial control.

Some examples of the method, system, and non-transitory computer-readable medium described above may further include monitoring the entity for compliance with the rules. In some examples of the method, system, and non-transitory computer-readable medium described above, said plurality of rules includes rules preventing objects unauthorized by the owner being placed or rendered in the assigned volume of three-dimensional space.

Some examples of the method, system, and non-transitory computer-readable medium described above may further include maintaining a registry of ownership. In some examples of the method, system, and non-transitory computer-readable medium described above, the ownership is transferable.

In some examples of the method, system, and non-transitory computer-readable medium described above, the ownership of the three-dimensional space is related to ownership of an associated physical space. In some examples of the method, system, and non-transitory computer-readable medium described above, the ownership of the three-dimensional space is related to ownership of an associated virtual space.

In some examples of the method, system, and non-transitory computer-readable medium described above, said plurality of rules are configured to include rules set by an adult wherein the adult authorized to set parental control rules for a child. In some examples of the method, system, and non-transitory computer-readable medium described above, said parental controls are based on at least one personal characteristic of the child wherein said personal characteristic includes at least one selected from the group of a face/visual likeness, a visual persona, a fingerprint, a retinal identity, a DNA, an age, a gender, nationality, genetic trait, physical characteristic, a behavior, a mood, a success metric such as completing an activity, and a location of the child.

In some examples of the method, system, and non-transitory computer-readable medium described above, said plurality of rules includes rules for obscuring the identity of a person in the portions of three-dimensional space. In some examples of the method, system, and non-transitory computer-readable medium described above, said plurality of rules includes rules for preventing rendering of personal information of a person. Personal information may include a face/visual likeness, a visual persona, a fingerprint, a retinal identity, a DNA, an age, a gender, nationality, genetic trait, physical characteristic, a behavior, a mood, a location, a license plate, a badge, a family affiliation, an educational affiliation, an employment affiliation, and a group affiliation.

In some examples of the method, system, and non-transitory computer-readable medium described above, said plurality of rules includes rules governing which objects can be rendered in association with a person. In some examples of the method, system, and non-transitory computer-readable medium described above, the rules for governing which objects can be rendered in association with a person include rules defining inappropriate content and rules for preventing rendering of objects with inappropriate content. Inappropriate content may include a pornographic content, visual depictions that are obscene, harmful to minors, hate groups, extremist groups, violence, illegal activity, religious content, a defamation content, a personal identity content, a racial content, an unapproved likeness, and a content potentially deemed offensive by another party.

In some examples of the method, system, and non-transitory computer-readable medium described above, the virtual three-dimensional space includes portions designated as private, and wherein said plurality of rules includes rules applied to rendered portions of virtual three-dimensional space when the rendered portions are designated as private. In some examples of the method, system, and non-transitory computer-readable medium described above, the virtual three-dimensional space includes portions designated as public, and wherein said plurality of rules includes rules applied to rendered portions of virtual three-dimensional space when the rendered portions are designated as public.

In some examples of the method, system, and non-transitory computer-readable medium described above, the zoning designations include one or more of residential, commercial, industrial, government, agricultural, public, and recreational. In some examples of the method, system, and non-transitory computer-readable medium described above, the zoning designations include one or more of residential, commercial, industrial, government, agricultural, public, and recreational.

In some examples of the method, system, and non-transitory computer-readable medium described above, said plurality of rules includes rules for providing a real-time alert in the three-dimensional space. In some examples of the method, system, and non-transitory computer-readable medium described above, the real-time alert is an emergency alert.

In some examples of the method, system, and non-transitory computer-readable medium described above, the request to render a volume of a three-dimensional space includes rendering the three-dimensional space for a user interacting with the system. In some examples of the method, system, and non-transitory computer-readable medium described above, said plurality of rules includes rules configured to apply when the user is operating a vehicle.

In some examples of the method, system, and non-transitory computer-readable medium described above, the user is associated with an additional user, and the plurality of said rules includes rules configured to apply when an identifier of the additional user located in the three-dimensional space is within an orientation of the user wherein said orientation includes at least one selected from the group of a proximity distance, a position, a placement, a perimeter, a field of view, a viewing angle, a relative velocity, a viewing validity, and a viewing time.

Some examples of the method, system, and non-transitory computer-readable medium described above may further include identifying a real-time location of the user, and wherein said plurality of rules includes rules configured to apply based on the user's location. Some examples of the method, system, and non-transitory computer-readable medium described above may further include tracking a gaze of the user, and wherein said plurality of rules includes rules configured to apply based on a direction of the user's gaze.

In some examples of the method, system, and non-transitory computer-readable medium described above, said plurality of rules includes rules configured to apply based on a viewing angle between the user's gaze and one of the one or more objects. In some examples of the method, system, and non-transitory computer-readable medium described above, said plurality of rules includes rules configured to apply based on a duration of the user's gaze.

Some examples of the method, system, and non-transitory computer-readable medium described above may further include tracking a relative velocity of the user, and wherein said plurality of rules includes rules configured to apply based on a velocity of the user relative to the three-dimensional space.

In some examples of the method, system, and non-transitory computer-readable medium described above, said plurality of rules includes rules configured to apply when the user is within an orientation of one object in the rendered volume of space wherein said orientation includes at least one selected from the group of a proximity distance, a position, a placement, a perimeter, a field of view, a viewing angle, a relative velocity, a viewing validity, and a viewing time. In some examples of the method, system, and non-transitory computer-readable medium described above, said plurality of rules includes rules configured to apply at a first time based on a location of the user at a different second time.

In some examples of the method, system, and non-transitory computer-readable medium described above, the one or more objects is a plurality of objects, and said plurality of rules includes rules configured to apply when a first object of the plurality of objects is within an orientation of a second object of the plurality of objects wherein said orientation includes at least one selected from the group of a proximity distance, a position, a placement, a perimeter, a field of view, a viewing angle, a relative velocity, a viewing validity, and a viewing time.

In some examples of the method, system, and non-transitory computer-readable medium described above, the one or more objects is a plurality of objects, and said plurality of rules includes rules configured to apply based on an orientation between a first object of the plurality of objects and second object of the plurality of objects changing over time wherein said orientation includes at least one selected from the group of a proximity distance, a position, a placement, a perimeter, a field of view, a viewing angle, a relative velocity, a viewing validity, and a viewing time. In some examples of the method, system, and non-transitory computer-readable medium described above, said plurality of rules includes rules for determining resolution of the one or more objects.

Some examples of the method, system, and non-transitory computer-readable medium described above may further include storing a digital record of applying the one or more rules for said portions of three-dimensional space to all said one or more objects corresponding to said portions of three-dimensional space.

A method of authorizing rendering of objects is described. The method may include authorizing objects to be rendered in three-dimensional spaces with a first system defining a virtual three-dimensional space including the placement of a plurality of objects in the three-dimensional space, the system comprising a second system defining said virtual three-dimensional space including a plurality of rules associated with portions of the three-dimensional space, and a device coupled to the first system and the second system, the method comprising: receiving a request to create one or more objects for said volume of three-dimensional space of said plurality of objects, wherein within the request includes a plurality of rules for said volume of three-dimensional space and verifying permission to create placement in the system for said volume of three-dimensional space of said plurality of objects.

A system for authorizing rendering of objects in three-dimensional spaces is described. The system may include a first system defining a virtual three-dimensional space including the placement of a plurality of objects in the three-dimensional space, the system further comprising a second system defining said virtual three-dimensional space including a plurality of rules associated with portions of the three-dimensional space and a device coupled to the first system and the second system, the device configured to perform the steps of receive a request to create one or more objects for said volume of three-dimensional space of said plurality of objects, wherein within the request includes a plurality of rules for said volume of three-dimensional space and verify permission to create placement in the system for said volume of three-dimensional space of said plurality of objects.

A non-transitory computer readable medium storing code is described, the code configured to authorize rendering of objects in three-dimensional spaces with a first system defining a virtual three-dimensional space including the placement of a plurality of objects in the three-dimensional space, the system comprising a second system defining said virtual three-dimensional space including a plurality of rules associated with portions of the three-dimensional space, and a device coupled to the first system and the second system, the code comprising instructions executable by a processor to receive a request to create one or more objects for said volume of three-dimensional space of said plurality of objects, wherein within the request includes a plurality of rules for said volume of three-dimensional space and verify permission to create placement in the system for said volume of three-dimensional space of said plurality of objects.

In some examples of the method, system, and non-transitory computer-readable medium described above, said permission includes verification of creation rights of said volume of three-dimensional space. In some examples of the method, system, and non-transitory computer-readable medium described above, said creation rights includes ownership of a physical three-dimensional space associated with the volume of three-dimensional space.

In some examples of the method, system, and non-transitory computer-readable medium described above, said plurality of rules includes rules for the owned volume of space wherein the rules for the owned volume of space are determined by the owner of the space. In some examples of the method, system, and non-transitory computer-readable medium described above, said plurality of rules includes rules allowing the owner of the space to enter into an agreement with another entity, wherein the agreement includes allowing the entity to have at least partial control of a portion of the three-dimensional space wherein said entity includes at least one selected from the group of a person, a group of persons, a government entity, and a business.

In some examples of the method, system, and non-transitory computer-readable medium described above, the plurality of rules includes rules governing the at least the partial control of the portion of three-dimensional space. In some examples of the method, system, and non-transitory computer-readable medium described above, the plurality of rules includes rules set by the owner determining the extent of the partial control. Partial control may be based on a subset of the three-dimensional space, different times of day/week/month/year, for a specific period of time, different rights granted to an actor, different tiers of ownership (such as a sublicensee or when rights may be shared or delegated), different resolutions, which users are currently in the three-dimensional space, and which objects are rendered or not rendered in the three-dimensional space at a specific time and/or location.

Some examples of the method, system, and non-transitory computer-readable medium described above may further include monitoring the entity for compliance with the rules. In some examples of the method, system, and non-transitory computer-readable medium described above, said plurality of rules includes rules preventing objects unauthorized by the owner from being placed in the assigned volume of three-dimensional space.

In some examples of the method, system, and non-transitory computer-readable medium described above, the ownership is transferable. In some examples of the method, system, and non-transitory computer-readable medium described above, the ownership of the three-dimensional space is related to ownership of an associated physical space. In some examples of the method, system, and non-transitory computer-readable medium described above, said volume of three-dimensional space includes at least one selected from the group of a person, an animal, a physical location, and an inanimate object.

In some examples of the method, system, and non-transitory computer-readable medium described above, each object has an owner. In some examples of the method, system, and non-transitory computer-readable medium described above, the owner of the object receives economic compensation in response to a request for the object.

In some examples of the method, system, and non-transitory computer-readable medium described above, the verifying permission includes determining if the owner of the object has licensed the object to a different entity. In some examples of the method, system, and non-transitory computer-readable medium described above, the verify permission step includes contacting a third-party enforcement system.

In some examples of the method, system, and non-transitory computer-readable medium described above, the verify permission step includes sending data generated by the second system to a third-party system. In some examples of the method, system, and non-transitory computer-readable medium described above, the third-party system is associated with a government entity. A government entity may include a city government, a county government, a state government, a federal government, a governing body, a branch, department, tribunal, court, an enforcement agency, a regulations entity, or any official or another person acting under color of law.

DETAILED DESCRIPTION

Figure 1:
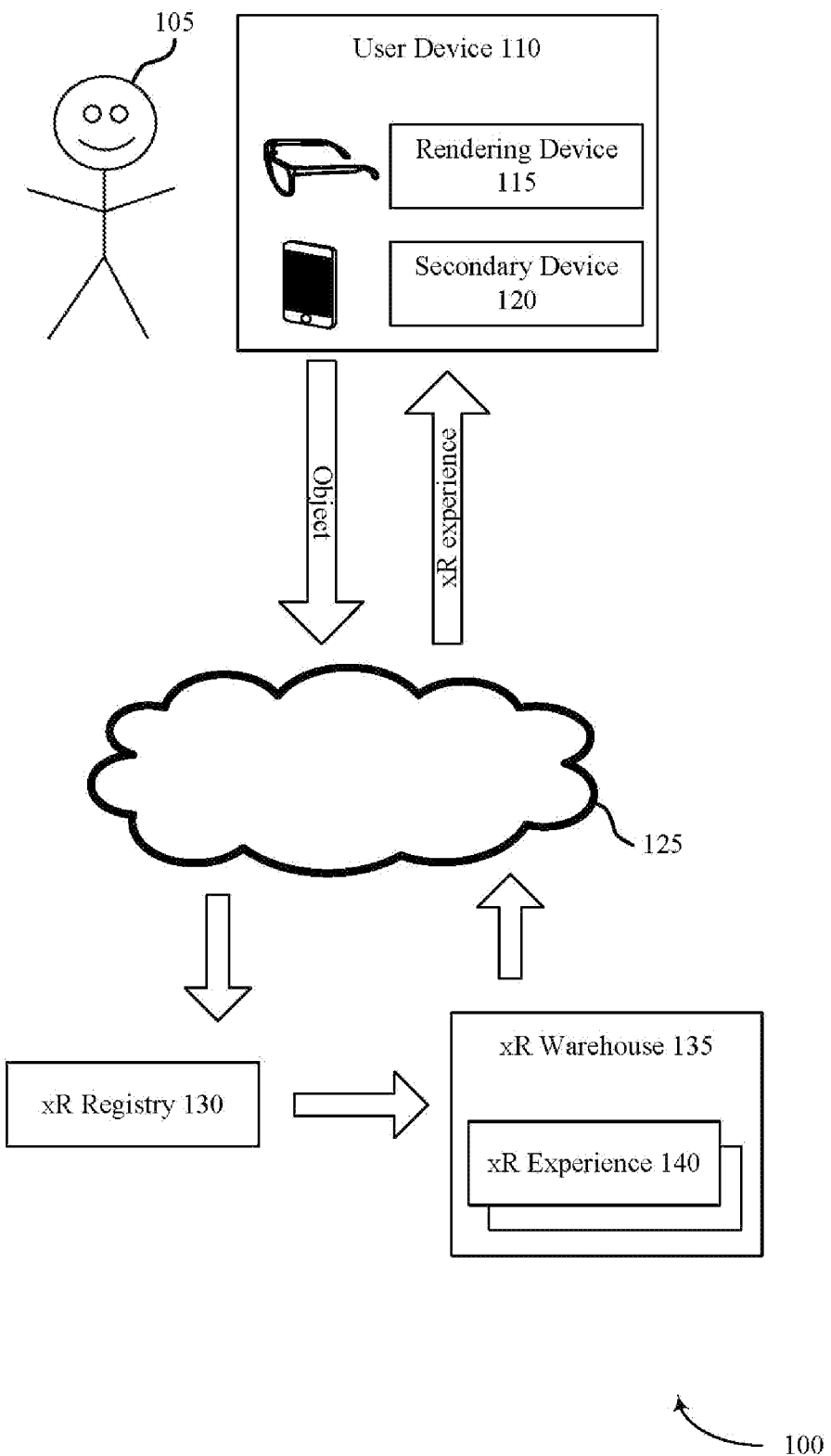
FIGS. 1 through 2 show examples of an extended reality (xR) registration system in accordance with aspects of the present disclosure.

An experience registry is disclosed that provides for the organization of virtual reality (VR), augmented reality (AR), and mixed reality (MR) experiences. There is a demand for a common registry for storing, managing and governing these experiences to ensure ownership, order and compliance in the real world. This common registry would allow users to manage certain rules in the registry across space, time, users, and devices, including a subset of very detailed properties and rights that can be associated with such users, experiences, and objects to which these experiences can be associated. These rights and rules can vary widely from the location which an object in these new types of experiences can be viewed to the time/date or user profile required to view such particular object.

Time may also play a critical role in these new types of combined physical/virtual experience, as information and experiences can be organized at the origin (in real-time, the "now") based on history/prior events, current events, viewer identity, permissions, and more. Many of these concepts can also be applied to the physical world in the near term, which would support "bridging" such areas between physical and digital worlds over time and facilitating a consistent consumer experience between physical and virtual worlds.

In the present disclosure, these new types of experiences and the associated rights, policies, and information may be referred to as xR and xR experiences. xR encompasses not only VR, AR, and MR experiences, but also those experiences that can be "generated" via artificial intelligence (AI), machine learning or other computer rendered mechanisms that we are seeing with speech, audio/visual, robotics, personal/virtual assistants, autonomous vehicles/devices, and more.

For example, the registry may be applied to AI applications to incorporate policies, rules, governance and compliance in that domain. In the case of AI, the registry may be used to protect against malicious bots that try to scam or imitate people; determine if a voice is real versus auto-generated from the latest generation of deep neural networks; determine if a face is real versus auto-generated; determine changes to security methods we use today (as today's voice recognition or video of a talking head might not be real or valid in the future); determine what type of data virtual assistants and robotic or autonomous devices are allowed to capture, when, how is it used, and how a consumer can control. Areas like OpenAI investigate these areas and may be able to leverage the registry and governance approaches highlighted in this disclosure.

There are many potential use cases that demonstrate the need for a common xR registry and associated platform for storing and managing the associated rights, rules, policies and governance. These experiences will often have components of social interaction and collaboration, which means social-graph driven collaboration and sharing of media, sentiment and status. Such social integration will demand the long-term need for rules and governance of xR experiences.

Furthermore, new xR experiences may enable persistence through geo-relevant content as well as data that xR capable rendering devices can leverage to perform object recognition. This creates a demand for the ability to track information visually and "in situ", meaning where information and items actually are. So instead of a traditional search index that gives us information through typed queries, consumers may demand the ability to obtain information on any item by directing an xR rendering device at the object (such as a camera, or xR enabled glasses). As a result, time will also become a variable (past, present, future) in how an xR experience is created and rendered to a consumer.

Some of the industries and markets that could benefit from such a registry include: individual and consumer rights, business, advertising, real estate, government, construction, and automotive (especially autonomous vehicles and heads up displays) as well as many other industries.

Examples of use cases include a consumer at a specific location utilizing a rendering device and looking in a certain direction or at a certain object, where xR information is overlaid in conjunction with or on top of physical, fixed location. The xR registry may help manage the relationships between relevant parties to an xR experience at a certain location.

In the case of a home, and the relevant parties may include the owner of home, a tenant (based on rights granted by owner), and a consumer of the xR experience. If the location is a place of business, the parties may include the owner of the building, the property manager, a franchise owner, a tenant (i.e., the business), and a consumer of the xR experience. In both the home and business cases, there may be a government party involved as well to ensure compliance with rules. Also, the place may be a public location.

In some cases, the object is a subset of a fixed location, such as an advertising billboard on a road or on a place of business. It is possible that one, multiple, or all parties could impact the xR experience, especially if multiple billboards are in place of business.

The xR experience may help ensure that signage is compliant with government regulations, as well as manage property rights among the various parties. For example, the xR registry may help ensure that a property owner can control digital billboards on their property, that a business can prevent their competition from making competing offers while customers walk through their locations, and the governments can prohibit inappropriate content within schools or government owned places.

The xR registry may also enable the ability to register and manage xR "applications" that are (or are not) permitted to play within certain criteria. In some cases, the xR experiences may be construction or safety related. For example, a fire inspector scenario may have the ability to locate building futures and hazardous materials. A building inspector may have the ability to perform remote inspection of construction at various stages.

In the case where a consumer is utilizing some rendering device and looking at an inanimate object at a specific location, xR information may be overlaid in conjunction with or on top of inanimate object. For example, the object could be a menu at a restaurant, a Tylenol bottle at store available for purchase, or a coupon at a retail store. In the case of a retail coupon, the xR experience may be created by and account for manufacturer, the brands of object, the store selling the object, the franchise of store, and the supply chain distributor.

For example, if a consumer views a washing machine, information relative to that machine may be rendered. The information may be based on the location of washing machine, and may be validated (i.e., using a blockchain). The owner of the machine may have rights to view the information based on their ownership and the location, or while the washing machine is in transport. In some examples, an object may have multiple owners of different types. For example, a manufacturer could also apply as special type of 'owner'—not to be confused with the owner of the washing machine (the consumer).

In some examples, the xR experiences rely on a mechanism for recognizing or identifying an inanimate object. In other examples, the information may be related to other people. For example, a consumer at a specific location may be utilizing a rendering device and looking in a certain direction at an individual. Then xR information may be overlaid in conjunction with or on top of the individual (i.e., an individual "banner").

In some cases, the banner will change based on where the individual is located. The rules may also change based on settings of the viewer and the person being viewed. For example, there may be mechanisms to control negative banners that represent defamation and shaming of others. In some cases, the banners may represent an individual or corporate brand.

In some examples, virtual objects may represent physical counterparts. In other cases, digital or virtual objects may exist that do not have a physical counterpart. The experiences related to a physical or virtual object may also depend on a time component, and on the relationships between parties (e.g., if multiple users are sharing an experience). In some cases, the xR registry may provide for pre-arranged relationships between objects or users, and allow for definition and filtering of rights and rules based on such relationships and location and proximity between such objects and users. For example, the xR experience my adapt for one spouse if the other spouse joins the same xR experience; or the xR experience my adapt to a child-friendly experience if children join the experience; or a new or different game play might render if a user's friends join the xR experience. The registry may allow for business rules and algorithms to be applied to such relationships and categories of relationships to tailor the xR experience.

The xR registry may also include measures to protect people against misuse of xR experiences. These measures may be represented in rules related to the objects and experiences. In some cases, the system may include mechanisms for detecting when such misuse situations are occurring, if someone is bypassing or not adhering to system, and notification/reporting of such. Additional use cases are described in more detail below.

An xR registry system may include a number of components that are common across use cases. First, a common registry (or registry of registries) which provides for the following: rights based on certain properties that can be associated with the xR experiences, including permissions and ability to permit, prohibit, or restrict experiences; rules for determining who can or cannot deliver an xR experience to consumers based on various properties such as ownership, location, proximity, devices, permissions, etc.; and rules for determining who can and cannot consume an xR experience based on various properties such as ownership, personal preferences, location, proximity, devices, permissions, etc.

The xR registry may to store information regarding what is allowed or prohibited based on such rights (who, what, where, when, etc.) and interface with third party systems that may also contain such data (as both input and output). It may also have the ability to create and manage such rights, including what objects can have xR experiences, and the xR experiences themselves. The registry may also store what xR experiences are available and have been created and available including associations with 'locations' or other mechanisms for association with an object or place.

The registry may also store locations (in space, time, z dimensions, etc.) to which an xR experience may be associated and displayed. This includes storing one or more locations where the displayed object can be viewed from (multiple dimensions which will not be a rectangle). The registry may also store other types of objects (inanimate objects, people, animals, etc.) and the ability to recognize the type of object, including if the objects are movable or changeable over time.

The registry can be centralized or decentralized (i.e., using blockchain distributed ledger-based solution). It may support for multiple types of actors in the overall ecosystem.

The client actors may include those who own physical property and/or virtual property, and those are ultimately looking to consume and 'experience' associated xR experiences with such physical and/or virtual property.

As in the real-world regulatory environment, an xR registry may have the ability to support different tiers of actors to enable ownership, sublicensing, compliance/enforcement, consumption, and parental controls of these new types of xR experiences.

The xR registry may enable the ability to tailor and filter xR experiences based on the variety of actors supported in the ecosystem. This ranges from the ability to permit or prohibit who has certain rights and control in the system to the ability for an actor to filter and tailor the ultimate consumer experience based on my personal preferences, geo-spatial location, etc.

The xR registry may support transaction management. Transaction management may refer to the ability for participants (actors) to transact within the system, including ability to monetize xR experiences, and manage registration and rights. The transactions that occur with the xR ecosystem may include exchanges based on virtual currency, rewards, benefits, and tokens.

The xR registry could be connected to various storefronts or other exchanges in which to manage a transaction. For example, a person may wish to lease access to his virtual property to allow a shop to advertise when cars drive by. The landlord provides access to for specified period of time, as well as potential limitations regarding what is allowed.

The xR registry may also enable compliance management. Compliance management may refer to techniques regarding how to store, manage and maintain compliance, which can encompass restrictions imposed by any combination of the following: ownership, moral, government, common sense, or other limitations.

The xR registry may support legal compliance; zoning compliance; respect for personal rights and likenesses, etc. For example, a city's or county's zoning laws with respect to virtual billboards may be stored in a compliance module that can check added registry elements for compliance (in real time, if needed). In some cases, the xR registry may interface with such appropriate third-party systems to achieve compliance.

In some examples, automated compliance or approval is tied to automated enforcement & tracking. For example, the system may apply AI or machine learning to automatically determine if something is and remains compliant over time.

Compliance management may also include reporting, tracking, and ultimately, automated compliance and enforcement with an audit log to verify past compliance. Metrics tracking may also be part of compliance. Thus, a party may leverage the system data or interface with third party data to automatically check that a particular billboard or property is still in compliance over time.

For example, if a property owner does something inconsistent with his lease, the owner is immediately notified and may have a mechanism to restrict access. As another example, a government agent may check if a remodel plan is compliant with zoning laws. Utilizing the xR registry for compliance management in the construction industry may enable (1) determining compliance before any construction starts, and (2) speed in making the compliance determination.

Key Terms

The following terms and concepts are referred to throughout the present disclosure. These descriptions are not limiting definitions but are presented here to clarify the meaning of these terms as used herein.

Activating (and deactivating) may refer to a process of allowing (or prohibiting) an object to be rendered or made available in an xR experience. An xR experience may be activated or deactivated an xR experience due to user or device orientation, user permissions, users currently or historically in the same xR experience, business model, laws, ordinances, regulations, etc.

Actor (or Entity) may refer to a participant in the ecosystem who can perform an action. These include individuals, consumers, parents, children, students, owners, sublicensees, governing entities, groups, teams, religious entity, and other ecosystem suppliers. In some cases, actors may be categorized according to different attributes such as age, sex, race, political affiliation, sexual orientation, religious affiliation, etc.

Actor Rights (or Entity Rights) may refer to rights granted by a government, organization or other entity or individual with the authorization to grant and enforce such rights. Examples may include: free speech and other legally or constitutionally granted rights, HOA rights, rights granted by an educational institution, or rights granted by a business (corporate policy, employee guidelines, rules of conduct, etc.). Such rights may be granted, earned, delegated, or inherited based on regulation, government or other rules.

Approval Service may refer to systems and services which allow manual or automated ability to approve creation, edit, association of right, rule, owner, sublicensee, government entity with an object. The system must understand the hierarchy and tiers of each actor, and the ability to simplify, and where possible, automate approval management. The system may support ability for moderators and for such moderator to prevent inappropriate objects, similar to how social media services (such as Facebook and Twitter) enable moderators to prevent individuals from slandering others or posting inappropriate content. The system may support ability to perform pre-approval which grants future or downstream rights, thus eliminating the need for every approval request to require manual approval. One example of pre-approval is to allow owners to pre-approve a sublicensee to perform creation, edit, association of right, rule, owner, sublicensee, government entity with an object.

Augmented Reality (AR) refers to the experience of a real-world environment where the real objects are "augmented" by computer-generated perceptual information. AR can include multiple sensory modalities, such as visual, auditory, haptic, somatosensory, and olfactory.

Compliance may refer to the process by which an actor (or entity) or an object observes and complies with the rights and rules defined. Compliance may include compliance with the statutory laws and/or regulations of a defining or authorizing entity. Compliance may include certification or confirmation that the doer of an action (such as a sublicensee, an advertiser, a developer of an xR experience, a consumer, or a member of the associated ecosystem) or object rendered in the xR ecosystem meets the requirements of accepted practices, legislation, prescribed rules and regulations, specified standards, or the terms of the rights and rules as defined in the xR ecosystem.

Compliance & Enforcement Service may refer to systems and/or services that offer manual and automated mechanism for identifying compliance or lack thereof. With the advent of new technologies in AI and machine learning, it may be possible to automatically detect objects and their compliance (or not) with defined rights and rules. The compliance service may also perform general data capture to facilitate reporting and analysis of the overall ecosystem. In some cases, the compliance and enforcement service may be automated, and such automation may use multiple data sources to determine if rights are properly implemented; may automatically detect problems and inconsistencies in the ecosystem; may self-validate when integrated with AI or machine learning (such as automatically checking if some form of signage is in compliance with rights and rules without need for an individual to visit the physical location). The compliance and enforcement service may interface with other third-party systems such as government systems (such as law enforcement) and regulation systems (such zoning regulations). The compliance and enforcement service may interface into third-party networks such as wirelines, wireless, telco, cable, and IoT networks to facilitate and enable regulations, compliance and enforcement as such networks may already perform certain levels of compliance and enforcement.

A Consumer (or user) may refer to a type of actor who views or consumes an xR experience as impacted by one or more rules (meaning filtering based on geo, spatial, time, filtering, personal preferences or profile, governance, etc. has been applied to impact the xR experience). The consumer experience will also be impacted based on how rights have been applied to the xR experience for that consumer. Additionally, the consumer experience may be impacted based on shared experiences with other consumers.

A Consumer Input Mechanism may refer to ways in which the consumer can directly impact and interact with the xR experience. Typically, the rendering device or other aspects of the xR ecosystem can automatically 'track' or 'follow' the consumer to capture such consumer input mechanisms. An xR experience may require more than just a location of a rendering device including a direction in which a consumer is viewing (via eye tracking or other mechanism of tracking consumer viewing); which one or more objects a consumer is viewing; how long a consumer if viewing the one or more objects; consumer's proximity to such one or more objects; how a consumer's six degrees of freedom (yaw, pitch, roll, left/right, up/down, forward/backward) impact the xR experience; how other natural interaction interfaces or senses (such as sound, smell, touch) impact the xR experience; and determination of whether other tracking mechanisms associated with the human body can be tracked and impact the xR experience.

Economic Compensation may refer to compensation or other form of attribution or payment to an actor. Economic compensation may include financial compensation (i.e., the act of providing a person with money, virtual currency, credits, or in-kind compensation), trade, ad-based (vs for a fee or payment), or any other thing of economic value.

Ecosystem Supplier may refer to those who are not users of the system, but other actors who provide components to enable the ecosystem, including but not limited to device manufacturers, component manufacturers, carriers, xR experience ("app") developers, integration partners, industry partners, service groups, third party identity systems, third party compliance and enforcement systems, xR warehouse providers, information network providers, transaction services, location services, government agencies, and backend suppliers.

Extended Reality (xR) is an umbrella term that includes AR, VR, and MR experiences.

Location is the place in which an xR experience occurs as well as the environment, including the orientation and time in which it occurs. Location may be available and change at any angle, anywhere, on any device (to allow interaction of many actors or users at the same time). Location may refer to a generalized representation and concept of location which is based on many dimensions: geo-location, depth, orientation, time, rights, etc. Location may include a physical place (territory, region, building, interior, space), a virtual place, or a combination of both physical and virtual places. Location may be impacted based on the social aspects of a xR experience and actors participating in such xR experience (e.g., who else is in the experience, where are they, etc.).

Localizer Service refers to a service responsible for tracking and mapping the xR experience against the surfaces and geometries of the location.

Governing Entity refers to one or more actors of governing body (such as the US Government) that has ability to define and implement special or overriding rules the xR experience must comply with (and potentially override rights if applicable or illegal). As with owners and other actors in the ecosystem, governing entities may be tiered. For example, government entities that may interact within the ecosystem and with other entities within the ecosystem may include: city, county, state and federal level actors; different or multiple governmental organizations (e.g., FDA, FCC, DHS, etc.); and entities that act or perform governance or compliance based on or on behalf of a governing entity (e.g., telcos, carriers, or social media platforms that are required to comply with certain governmental controls and restrictions). A governing entity may enforce rules and compliance at the time information goes into an xR registry, and may enforce rules and compliance via filtering or otherwise at the time what information comes out of it.

Identity Service refers to the core service which stores identity and other personal information of a consumer, owner, sublicensee, governing entity, and/or other actor. The identity service can be based on self-sovereignty concepts (e.g., as implemented via blockchain) as well a centralized approach, Identity can exist in both physical and virtual domains. The identity service may provide the ability to link physical and virtual identities.

Mixed reality (MR) refers to a combination of AR and and VR. The merging of real and virtual worlds may produce new environments and visualizations where physical and digital objects co-exist and interact in real time. MR can include multiple sensory modalities, such as visual, auditory, haptic, somatosensory, and olfactory.

Object refers to a place, person, or thing to which a rule can be applied and impacts the xR experience based on applicable rules and rights. Objects may be real property, virtual property, personal property, individuals, or entities. Different objects may have different attributes, for example, for a building or real estate property, location may be a primary attribute. For inanimate objects and individuals, other object recognition parameters may be relevant. In some cases, an object (including a location) can exist in the real world, a virtual world, or both.

Object Attributes may refer to characteristics and properties that can be applied to an object and be used in in conjunction with rules and rights to impact how an object and/or the xR experience is rendered. Object attributes may include: location, location type, orientation, spatial anchoring, proximity, point cloud mapping, viewing angle, time, gaze time, resolution, quality level, obstructions, controls, privacy settings, object preferences, categorizations, capabilities, experience types, experience measurement parameters, limits (e.g., the quantity of objects or users allowed for a specific area or xR experience), and actor viewing parameters. Actor viewing parameters and controls may be based on age, gender, permissions, preferences, compliance parameters, management rights, object type, user groups, security levels, ownership information, delegation rights, employee information, parental controls, security levels, privacy controls, security clearance, beliefs, mood, time of day, emotional state, categorization based on type of actor, relationship to other actors at current, past or future time, and capabilities of actor rendering device(s).

Orientation may refer to the real-time orientation of an actor, object or an xR experience based on one or more of the following: proximity, position & placement, field of view, viewing angle, viewing/gaze time, viewing/gaze tracking, perimeter, viewing validity and resolution.

Owner refers to one or more actors who own and/or control a virtual object (in the xR space) or physical object (based on location, time, and other properties). An owner has the ability to set certain types of rights to be associated with an object. In some cases a physical owner may be distinct from a virtual owner. An object may have different ownership tiers. For example, real property may have an owner, a renter, a franchiser, etc. An inanimate object may have a manufacturer (or more than one) and a purchaser. In some cases, ownership may be shared or fractional (e.g., in the case of a business).

Perimeter refers to a range, area, and radius (separate from viewing angle) in which an xR experience may or may not occur. Perimeter could be a property of the person viewing and/or a property of the object to be viewed. The viewing perimeter can define different regions with potentially different restrictions of an actor's view or viewing angle. Perimeter can also define a secondary viewing area or radius. That is, an object can be viewed from different "dimensions" other than viewing angle. In some cases, an object perimeter can be defined by surrounding rights. In some cases, a perimeter can be tied to different location regions, and can support different types of "outlines" that may not be based purely on radius or distance.

Private and Public refers to a characteristic of who can view rules (and therefore certain xR experiences) and which objects upon which rules may or may not be applied. Making an xR experience private means that such rules or xR experience can restricted to a specified or known user (or defined subset of users) meeting a certain criteria. Making an xR experience public means the experience is made available to all users or a specified type of group of users based on predefined properties.

Proximity refers to the distance between objects, actors, xR experiences, and rendering devices based on varying locations and time. Proximity may be specific to rendering device and rendering device capability. For example, rendering device may need to calculate and format proximity differently based on car heads up display on windshield, wearable glasses, retinal display or phone. Proximity may apply to and be determined differently for visual distance, sound distance and smell distance. For example, a sound coming from a certain direction or angle may be made to behave more realistically by having it sound like it is getting closer or farther away as a consumer moves their current position or head relative to the virtual sound source.

A Real World Data Representation Service (RWDRS) refers to systems and/or services that store image, video, point matrices, polygon meshes, voxels (light field information), depth maps or other recognition information that can be used to identify an object and its location and facilitate seamlessly mapping of an xR experience to objects and/or locations.

A Rendering Device refers to a phone, glasses, head-up display (HUD) or other device (e.g., used by a consumer to render and consume an xR experience vis one or more of sight, sound, touch, smell or taste.

Resolution may refer to the level of resolution or rendering quality that that can be applied to the xR experience based on a rule, right, actor, or other.

A Right defines who is allowed to perform a certain act on the xR ecosystem, such as creating or modifying a rule, object, xR experience, etc. Rights also identify who can read/write to the xR registry (in concert with applicable rules).

A Rule may refer to a property (or combination of properties) that can be associated with (or used for filtering purposes with) objects, consumers, owners, governmental entities, and/or sublicensees and impact or govern (permit, prohibit, etc.) what can happen in an xR experience. It may also refer to how an xR experience behaves or is rendered via a rendering device in either virtual and/or physical worlds (or the combination of both, especially in the case of AR/MR).

Signage may refer to displays of information for guidance, commerce, warning, or other purposes. In some embodiments, advertising, signage and billboards will be a significant part of an xR experience. Various aspects of signage rights may impact the use cases described herein, especially as it relates to virtual property rights (or combination of physical and virtual rights). Thus, an xR registry may incorporate principles of physical signage rights.

State refers to a set of information related to a system, rule, object or actor at a particular point in time. For example, the state of an xR system may include a map of the real world and an overlay of the xR objects and attributes, where there are rights and available actions associated with the objects. In some examples, there may be one single coherent state to maintain rapid response to queries on client. Other examples include multiple states.

Sublicensee refers to one or more actors who have rights granted to them from an owner for virtual object (in the xR space) or physical object. For example, if an object is property, an advertiser, tenant or landlord could be granted rights on behalf of the owner. In the case of an inanimate object, a distributor, manufacturer, installer, or store selling the object may be a sublicensee. Supply chain suppliers could be sublicensees. If the object is an individual, the sublicensee may represent another individual with some authority over or agency to act on behalf that individual (e.g., a parent or legal guardian).

Third Party Rights Database refers to separate database(s) for storing rights, rules and ownership data of objects, such as property records & ownership, patents, trademarks, likeness, brands, domain names, etc.

Time refers to present current, past and future times (and must be clearly articulated as an object attribute.) Time parameters may enable viewing an experience or location as it was in the past, and viewing an experience as one might believe it will be in the future. xR experiences, including rights and rules may change over time, including support for time frame slicing, certain dates, recurring events, and expiration scenarios. Time can also change with location. In some examples, time can be used to define rights for current and future viewing (i.e., who, how, when what, etc.).

Transaction Service may refer to systems and/or services that enables transactions (financial, advertising, coupons, or other) associated with an xR experience. It may also integrate with the overall ecosystem and provides a marketplace where actors place and fulfill orders.

Transform Service refers to systems and/or services used to 'transform' or apply filters and rules from the xR registry to create a 'composited' view of what can be rendered.

Vehicle refers to an object used for transporting people or goods in which a rendering device is integrated (e.g., a HUD on a windshield). Example vehicles may include cars, trucks, motorcycles, bikes, farm equipment, lawn mowers, airplanes, helicopters, drones.

Viewing Angle is the angle and direction of which one views an xR experience (i.e., a user may see different things based on viewing angle, direction and gaze time). The viewing angle also provides the basis for a "field of view" for the consumer which is the extent of the observable world that is experienced at any given moment. The viewing angle can impact the xR experience in multiple ways, and may interact with line-of-sight, proximity, perimeter, and obstruction parameters. Similar point-of-view concepts may apply to other senses, such as sound and smell. That is, xR experiences may be tailored and enhanced using directional techniques with these other senses.

Viewing/Gaze Time refers to the time in which a user of the xR experience engages with a specific object or set of objects in the xR experience. In some cases, eye-tracking can be used to unlock "foveated rendering," a technique in which graphical fidelity is only prioritized for the tiny portion of the display your pupils are focused on. Eye tracking can be used to determine the pose of the eye, the direction of gaze (e.g., to infer what is of interest to the viewer) and potentially how long a viewer is gazing in a direction or at a specific item or object (and therefore providing data about the consumer's visual search, focus and attention processes which can be used for business, marketing and advertising purposes). This enables the xR ecosystem to respond to the consumer's actions and interact with the consumer. Gaze tracking maybe used to influence a consumer's interest, bias or decision making, which increases the need for rights and rules (and the xR registry) to allow such capabilities or prohibit such capabilities to minimize or eliminate unauthorized use or misuse.

Viewing Validity defines what can or cannot be seen (in the current moment or at another time, such as in the future or in the past). Viewing validity can be environmental (e.g., based on an obstruction or occlusion). Viewing validity may also determine what obstructions are valid and which should be ignored. Viewing validity can be entity-controlled. For example, a person may permit or prohibit viewing based on user profile/properties. In some cases, there may be emergency override conditions. In some cases, viewing validity may be based on factors such as relative velocity. For example, one may see something different moving in a car versus when walking towards an object.

Virtual reality (VR) refers to the experience of a simulated environment that includes computer-generated perceptual information. VR can include multiple sensory modalities, such as visual, auditory, haptic, somatosensory, and olfactory.

An xR Experience refers to a resulting experience of a consumer (e.g., sight, smell, audio, or a combination of senses) that combines virtual and/or physical objects(s) on (or via) one or more rendering devices as impacted by rules and rights. The xR experience will be directly impacted based on the localizer service and RWDRS.

An xR Registry (or simply, the registry) refers to systems and/or services that store all rules, rights and state(s) of ecosystem components and the ability to reference, link with, and associate such with identity DB, xR experience, xR warehouse, governing entity and other systems in the ecosystem.

An xR Warehouse refers to the location that stores xR experiences/applications. The xR warehouse is a part of the xR ecosystem but may be operated independently of the xR registry.

Extended Reality

Extended reality (xR) encompasses AR, VR and MR experiences. An xR experience combines virtual and physical objects on one or more rendering devices as impacted by rules and rights, as well as location, time, viewing angle, proximity, gaze (and gaze time), and other parameters discussed herein. There are a variety of possible xR experiences, several of which are described below.

xR experiences persist in the real world across space, time and rendering devices and enable what are often called ambient environments and ambient computing. Incorporating the context of the real world (such as the 3D of the real world), can be critical to blending virtual and real together. An xR experience can change based on different dimensions such as mood, environmental context, and time of day.

Augmented Reality (AR) is a technology that layers computer-generated enhancements atop an existing reality in order to make the reality more meaningful and interactive. AR may be developed into apps and used on mobile devices to blend digital components into the real world in such a way that they enhance one another. AR may be used to display score overlays on telecasted sports games and pop out 3D emails, photos or text messages on mobile devices. AR may also incorporate holograms and motion activated commands.

Virtual reality (VR) is an artificial, computer-generated simulation or recreation of a real-life environment or situation. It immerses the user, making them feel like they are experiencing the simulated reality firsthand, primarily by stimulating their vision and hearing. VR may be achieved by wearing a headset equipped with the technology.

VR may be used to create and enhance an imaginary reality for gaming, entertainment, and play (such as video and computer games, or 3D movies, head mounted displays). It may also be used to enhance training for real-life environments by creating a simulation of reality where people can practice beforehand (e.g., flight simulators for pilots).

Virtual reality may be made possible through a coding language such as Virtual Reality Modeling Language (VRML), X3D and others. Such languages can be used to create a series of images and specify what types of interactions are possible for them.

AR and VR may be seen as inverse reflections of each other with regard to what each technology seeks to accomplish and deliver for the user. VR offers a digital recreation of a real-life setting, while AR delivers virtual elements as an overlay to the real world. However, VR and AR are not mutually exclusive. They may be blended together to generate an even more immersive experience. For example, haptic feedback (the vibration and sensation added to interaction with graphics) is considered an augmentation. However, it is commonly used within a virtual reality setting to make the experience more lifelike though touch.

VR and AR are examples of experiences that enable people to become immersed in a simulated environment for entertainment and play, or to add a new dimension of interaction between digital devices and the real world. Taken together, xR interfaces may offer visualization (e.g., visualize what a new couch will look like in your living room before buying it), contextual information (e.g., see instructions on how to replace a toner cartridge directly overlaid on the printer), immersive experiences (e.g., walk beside dinosaurs to experience what life may have been like in Jurassic period), and natural interfaces (e.g., collaboratively edit an architectural model on a table top or directly on site).

In some cases, xR experiences may be stored in digital files in various formats. For example, the GL Transmission Format (GLTF) or universal scene descriptor (USD) formats can be used. GLTF is an extensible, common publishing format for 3D content tools and services that streamlines authoring workflows and enables interoperable use of content. USD is an example of a zero-compression, non-encrypted file that stores assets such as textures that enable rendering of objects. The lack of compression allows for "direct" consumption of a file. However, file formats may also provide some mechanism for internal compression.

Pipelines capable of producing computer graphics films and games may generate, store, and transmit great quantities of 3D data, which may be referred to as a "scene description". Each of many cooperating applications in the pipeline (e.g., modeling, shading, animation, lighting, effects, rendering) may have its own form of scene description tailored to the specific needs and workflows of the application. In some examples, these formats may be unreadable and uneditable by other applications. In other examples, a same format may be used by multiple stages in the pipeline.

In some cases, an xR file may organize data into hierarchical namespaces of primitives (or "prims" for short). In addition to child prims, each prim can contain attributes and relationships, collectively known as properties. Attributes have typed values that can vary over time; Relationships are multi-target "pointers" to other objects in a hierarchy. Targets may be remapped automatically when referencing causes namespaces to change. Both prims and properties can also have (non-time-varying) metadata. Prims and their contents may be organized into a file abstraction known as a layer.

In some examples, an xR experience may differ based on location, and may merge the physical and virtual worlds into a single, seamless experience. An xR experience may be based on a current location, a past location, or an anticipated or hypothetical location.

The location the xR experience is based on can be a physical place or a virtual place (of the combination of both). The xR experience may use location and orientation to replace a physical environment (as in the case of VR), or to augment the physical environment (as in the cases of AR and MR). The xR experience may utilize physical details of the environment to create this combined experience.

An xR location may work at a range of angles and on a variety of devices (to allow interaction of many users at the same time). Therefore, a location may not only include a mechanism for determining current physical location (e.g., using data from the Localizer Service), but may also incorporate time and orientation (including viewing angle, proximity, occlusion, etc.). Location may also include information regarding the social aspects of the xR experience (i.e., who else is in the experience, where are they, etc.).

Examples of specific physical locations and spaces include geographic-based coordinates, regions (country, state, county, city, portion of city, block, complex), buildings (home, office building, school) or group of buildings (mall, government complex, multiple builds of a school), building perimeters, and interior sections of buildings and locations (including depending direction of gaze and proximity).

Location identifiers may include coordinates, cross streets, and location data based on maps and floor plans.

Based on the variety of potential locations, an xR system may layer information of the physical world (and even virtual world) to manage the resulting xR experiences. Example layers could be water features like streams and lakes, terrain, roads, political boundaries, owned land parcels, building footprints, utility lines, etc. One way to use this would be to layer in the AR view only on relevant items. Therefore, the xR ecosystem may use real-time analysis for final rendering.

In some cases, a location may include different objects or sub-locations. For example, a tree in front of a house may be a different layer from the house, which may be a different layer from the street plan. Physical locations may also have varying sizes and shapes, including unusual shapes for geo-control. An xR system may store all types of shapes in the xR registry for purposes of setting rules and enforcing rights.

An xR system may utilize a variety of physical location-tracking technologies with varying degrees of precision that can help with identifying location (and orientation) for xR experiences. Examples include GPS, compass heading, beacons, beacon triangulation, WiFi, WiFi triangulation, mesh networks, localized secure networks, satellite, media carriers (i.e., telco, cable networks), IP based geo-location services, geo-enforcement technologies, spatial anchoring, or any combination thereof.

An xR system may also utilize a variety of technologies for capturing detail of a location, determining viewing angle/direction, and establishing proximity such as techniques to create a 3D scan (e.g., RGB camera plus a depth camera, single RGB camera and computer vision, visual inertial odometry, or a pre-existing online database of 3D scan data). Other technologies include digital photogrammetry, LiDAR, infrared or structured light 3D scanning, laser scans, as well as visual and audio positioning methodologies (e.g. echolocation).

For example, a person may walk into a rented space and open an app that lets them navigate the apartment. They may scan their phone around the apartment to find AR icons near the exact positions of the router, the thermostat, or extra towels and may even type in "forks" to search for the drawer containing cutlery. To support these features, the device may use an exact position and orientation in the house, down to the centimeter. This may be possible using a visual mapping and localization system (SLAM) that can parse a visual scene and track position in a highly accurate manner. In some cases, these systems may rely on custom marker images and QR codes that provide highly conspicuous visual features to help a device measure its position relative to that marker.

Some devices may utilize 3D depth sensors and cameras to enable a marker-less mapping and localization. A 3D point cloud map may be an external reference in this system. In some cases, semantic mapping may enable maps that are complex and dynamically understand the world around them.

Proximity may be a component of or used in conjunction with location information. Proximity is the distance between objects, xR experiences, rendering devices based on varying locations and time. Proximity can be based on: distance between objects, distance between rendering devices (physically or virtually), distance between objects and rendering devices, distance between people, and changes in distance over time. In some cases, proximity parameters may depend on the device format (i.e., phone vs vehicle HUD).

Proximity may apply to a variety of senses, such as sound and smell. It is possible for xR experiences to be tailored and enhanced using proximity techniques with these other senses. For example, a sound coming from a certain direction or angle can be made to behave more realistically by having it sound like it is getting closer or farther away as one moves their current position or head related to the virtual sound source.

The following examples illustrate the use of proximity in an xR experience. If a person is interested in a particular restaurant, the system may automatically show the user the closest restaurant of that type. In some cases, the rendered experience can change in real time as proximity to other objects or locations changes.

Similarly, if a car is running low on gas (or battery level), a rendering device may automatically inform the user of the next refill station. If a person is within a certain range of a school, the system may prohibit promotion of 'inappropriate' messages (smoking, alcohol, porn, etc.).

Other examples may relate to different legal jurisdictions. For example, an xR system may apply new rules and rights once a use enters a different city or county boundary. That is, the content may change based on a boundary case. If a person enters a new county, new laws and zoning may apply. If a person enters a new country, certain religious/content filters may apply.

Also, a rendering device may have the ability to auto-zoom or auto-focus (similar to binoculars) based on gaze direction. For example, the device can automatically detect what a user is viewing, and display more or less detail accordingly. In some cases, the level of detail and context that can be presented to user may change based on proximity and viewing angle.

For example, if a person is 5 miles away, they may only need to know that a restaurant is 5 miles away. When the person gets closer, or when the xR system detects their focus on the restaurant, a menu may be presented.

In some cases, the operational modes (including on, off and sleep modes) of a rendering device may also depend on proximity and viewing angle, or the development of these variables over time. In some examples, an xR experience may include an indicator that more information or another experience is available for selection. These indicators may also depend on factors such as the identity of the viewer. In general, an xR view may be tuned by pre-arranged relationships and their proximity.

In some cases, both a user and a developer may have the ability to tailor experience based on rules/rights—ability for consumer to tailor/tune; same for content experience creator. In some examples, the environment may change if there are multiple participants in the area. As another example of a proximity based xR experience, a rendering device may help guide an emergency responder using AR display, so that different members of the response team are not sent to same place. In some cases, users may share virtual 'artifacts' for someone else to find once they have visited a place. A proximity-based xR experience may also facilitate geocaching.

In some cases, an xR experience may change based on whether a location is identified as a work location, a home location, or an entertainment location, etc. If a person is sitting in their office, they may not want to see certain ads or experiences that are not relevant to a workplace environment. Also, a person in a familiar environment may be presented with a different experience than a tourist or stranger.

On the other hand, a work location may trigger xR experiences that are relevant to the workplace or initiated by an employer. Examples may include in-office promotions, HR notifications, a guest mode that shows guest where bathroom is or where conference room is, etc.

A consumer or business owner may enable or disable xR experiences based on a range to desired object or location. For example, a store owner may want an experience to be triggered for customers who are currently on a store patio. The trigger may be defined relative to a location, a person, or an object.

In another example, an xR experience may warn a construction worker if they are digging too close to a live power line or sensitive equipment, if an action or plan violates a building code, if electrical is being placed too close to plumbing, etc.

In some cases, an xR system may identify distraction free zones and filter experiences accordingly. For examples, experiences may be filtered based on proximity to natural disasters (this is an example of time-based proximity). The xR system may also restrict or prohibit advertising in times crisis or ensure a focus on emergency messaging. The xR system may also be used to redirect traffic in the case of an emergency that impacts a traffic route, or trigger an emergency shutdown switch for systems that may be impacted by such an emergency.

Visibility of xR experiences may vary according to a location in space, a point in time, and who is observing. For example, if a child is nearby and observing an event, their experience may filter out content that is not appropriate for children. Hence, the definition of the xR object is based on space, time and proximity of person or even other non-person objects.

An xR system may utilize a wide spectrum of proximity-tracking technologies with varying degrees of precision that can help with identifying proximity. Examples include: GPS, Wi-Fi, beacons based on Bluetooth or other technology, carrier services, LIDAR, different cameras types, proximity sources and databases.

In addition to proximity, an xR system may utilize viewing or gaze tracking to customize experiences. Gaze tracking is the ability to track a person's attention or gaze (what object or set of objects the user focusing on). This information can be used to tailor and optimize the xR experience and can be used for advertising and marketing purposes. Since gaze-tracking can be abused to influence people's biases and decision-making, rules and rights may be defined to minimize or eliminate such misuse.

Eye-tracking applications can be distinguished as diagnostic or interactive systems. In diagnostic mode, the eye-tracker may provide data about the observer's visual search and attention processes. In interactive mode, the eye-tracker is used as an input device. From a general point of view, an interactive system responds to the observer's actions and interacts with them accordingly.

Viewing tracking may be used as a mechanism for user input to control experiences by devices, such as glasses or a HUD, with the ability to auto-zoom or auto-focus. For example, if a person is looking at something in the distance, the device may have the ability to auto-zoom the display and show larger version with more detailed information. A rendering device with view tracking may enable the ability to control on/off modes for AR/VR (other than having to touch a button on a person's glasses). They may also have the ability to display an 'indicator' that there is additional info available (icon in corner of lens, or other sensory notification) to notify user that there is AR/VR content/experience, and then provide the ability to enable such experience (or types of experience to enable).

Other capabilities that might be enabled by view tracking include ad rotation if a person looking at same spot, auto focus to show additional detail, the ability to identify focus and determine what someone looks at from a single vantage point. View tracking may also enable attention-based rewards and tokens. Also, experiences such as advertisements may be static until someone looks at them, and then become interactive. As another example, if a person looks at a billboard long enough, it may be entered into a "cookie list" (as is common with a typical web browser).

Thus, knowing the location where a rendering experience occurs may not be sufficient to deliver a complete experience. In addition to being based on the direction a user is looking, a truly seamless xR experience may also be based on how long they look at a specific object, their movements, and other tracking mechanisms. Together these tracking mechanisms may be known as consumer input mechanisms.

That is, consumer input mechanisms are the ways in which the consumer can directly impact the xR experience. Typically, the rendering device or other aspects of the xR ecosystem can automatically 'track' or 'follow' the consumer to capture such consumer input mechanisms (although there may be other ways to capture such information).

In some examples, consumer input in the xR experience may be based on a three-step process: look at something, point at it to select it, then click to input the selection. When eyes become the selection tool, the first two steps become one. There is also significant power in non-verbal cues in multi-user xR. For example, with eye-tracking, an xR representation of a person (a.k.a. their "avatar") can flick a sideways glance, blink, or exhibit other eye based social actions, which may form an important part of a natural social dynamic.

Rights and Rules

One of the functions of the xR registry is to define and enforce rights and rules surrounding how people consume (or are subjected to) xR experiences. A right in the xR ecosystem defines who is allowed to perform a certain act within the system, such as creating or modifying a rule, object, xR experience, etc. rights also identify who can read/write to the xR registry (in concert with applicable rules).

For example, a bundle of rights may include rights to own, view, create, add, modify, share, hide, restrict, apply, compliance, require behavior, and tax. Examples of enumerated rights might include the right to create, own, rent/lease, override (such as an ability for government authorities to override certain rights), activate (see separate section of this document), deactivate (see separate section of this document), restrict, and disable (such as an ability for government authorities to disable someone for not paying taxes).

Rights (and individuals who can manage or use rights) can be white-listed or black-listed; inheritance and delegation may also be also supported. Types of rights might include compliance (manual or automated), permission or prohibition of behavior, control/ownership (including different tiers of control/ownership), and trust (for applications, individuals, businesses, devices, networks, etc.) Rights may also include the right to enforce rules. Additional rights might include rights to social media/sharing, the ability to add, interrogate, edit, override.

Within the xR ecosystem, rights may clearly define, support and identify ownership. For example, rights may define who has the right to use, the right to exclude, the right to transfer. They may also define terms for each of these rights. In some cases, rights can be combined and tiered. That is, there can be different levels and tiers of control, including who controls what can and cannot be licensed or delegated. Information related to rights may be stored in the xR registry.

In addition to rights, the xR ecosystem may define rules. A rule can be viewed as property (or a combination of properties) that can be associated with (or used for filtering purposes with) objects, consumers, owners, governmental entities, and/or sublicensees and impact or govern (permit, prohibit, etc.) For example, rules may determine how an xR experience behaves or is rendered via a rendering device in either virtual and/or physical worlds (or the combination of both, especially in the case of AR/MR). Rules can be tied to governance, ownership, user preferences, user profiles, supply chain characteristics (leasing, distribution, manufacturing, other supply chain areas), location, time, recognition and more.

Rules may restrict certain actions within the xR ecosystem. For example, rules may be used to prevent the reading/writing to the xR registry, and they may be used to allow for filtering xR experience content for a given individual. A rule can be characterized by different characteristics. For example, there may be both public and private rules and filters that impact the presentation of xR experiences. These rules may take into account privacy considerations based on legal restrictions (such as COPA, GDPR) and moral considerations.

Rules may also be implemented with different levels and/or tiers of control to define who controls and what can and cannot be licensed or delegated. They may also define different types of criteria (e.g., date/time, persona, tiers, region, etc.) that could be used for control. In some cases, rules may be mixed and matched at the same time based on generic business rules.

Types of rules may include government rules and regulation rules. Government rules may include legal rights or rules defined by and/or enforced by a government or governmental agency such as ordinances and zoning, including zoning designations used by local governments to categorize zoning within a city, municipality, or a county. Zoning categories may include residential (usually divided into single-family or multifamily use), commercial (i.e., an area allowed for commercial activities like retail stores and offices), industrial (i.e., property used for manufacturing purposes), agricultural (i.e., an area set aside for farming activities), and recreational (i.e., land used for recreational activities).

The rules within an xR ecosystem may also govern property rights such as those relating to personal property, real property, individual property (i.e., what can be shown about a person), and the right of publicity. Other governmental regulations include laws and ordinances (trespassing, speed limits, signage regulations/restrictions, etc.), consumer and business privacy regulations, trespassing laws, health and safety regulations, legal compliance (e.g., with anti-defamation rules), speed limits, driving 'zones' (e.g., school zones), accessibility rules, building codes and regulations, safety regulations, airspace & drone regulations, regulations governing vehicles (including autonomous vehicles), surveillance permissions and tracking, financial and business regulations, monetary policy, antitrust regulations, and regulations governing utilities.

In some examples, government agencies that enforce these rules may participate as actors within the xR ecosystem. These agencies could include the Justice Department, the Food and Drug Administration (FDA), the Federal Communications Commission (FCC) and Federal Trade Commission (FTC), the Environmental Protection agency (EPA), as well as local law enforcement agencies.

Regulation rules may refer to principles or rules (with or without the coercive power of law) employed in controlling, directing or managing an activity, organization, system. Such rules can be based on and meant to carry out a specific piece of legislation, such as for the protection of the environment or zoning restriction. Regulations are enforced by a regulatory agency formed or mandated to carry out the purpose of provisions of a legislation or regulatory requirement.

Regulation rules may include non-government regulations, HOA rules and regulations, lease rules for tenant(s) from landlord, building/property owner, rules for educational institutions, employer and business rules and guidelines, club rules, and political party rules. As with government rules, regulation rules may be incorporated in an xR ecosystem.

Property Rights

Among the rights and rules that an xR registry may maintain are those related to property. Considerations regarding property rights impact a variety of xR use cases, especially regarding virtual property rights (or combinations of physical and virtual rights). A representation of certain property rights may be reflected in an xR registry in the object attributes.

Different types of property may include personal property (movable), what can be shown about personal property owned (car, plane, motorcycle, etc.), real property (immovable), digital signage such as billboards and promotions (e.g., rights for control of the signage), virtual rights separate from physical rights, rights related to individuals (e.g., what can be shown about an individual), free speech rights, and publicity rights.

With respect to property rights, property law is the area of law that governs the various forms of ownership and tenancy in real property (land as distinct from personal or movable possessions) and in personal property, within the common law legal system. In the civil law system, there is a division between movable and immovable property, which shall apply in the virtual world as well.

Rights of property ownership can be extended by using patents and copyrights to protect scarce physical resources (such as houses, cars, books, shoes, land, tire irons or cellphones), non-human creatures (such as dogs, cats, horses or birds) and even some intellectual property (such as inventions, ideas or words).

Property rights may be viewed as socially-enforced constructs in economics for determining how a resource or economic good is used and owned. Resources can be owned by (and hence be the property of) individuals, associations or governments. In some cases, property rights can be viewed as an attribute of an economic good. This attribute has four broad components and is often referred to as a "bundle of rights": the right to use the good, the right to earn income from the good, the right to transfer the good to others, and the right to enforce property rights.

The following list is ordered from no property rights defined to all property rights being held by individuals: open access property, public property, common property, and private property.

Open-access property (res nullius) may not be "owned" by anyone. It is non-excludable (no one can exclude anyone else from using it) but may be rival (one person's use of it reduces the quantity available to other users). Open-access property is not managed by anyone, and access to it is not controlled. There is no constraint on anyone using open-access property (excluding people is either impossible or prohibitively costly). Examples of open-access property are the upper atmosphere (navigable airspace) or ocean fisheries (navigable waterways).

Open-access property may exist because ownership has never been established, granted, by laws within a particular country, or because no effective controls are in place, or feasible, i.e., the cost of exclusion outweighs the benefits. The government can sometimes effectively convert open access property into private, common or public property through the land grant process, by legislating to define public/private rights previously not granted.

Public property (also known as state property) can be property that is owned by all, but its access and use are controlled by the federal government, state or community. An example is a national or state park, or a government owned or state-owned enterprise.

Common property or collective property can be property that is owned by a group of individuals. Access, use, and exclusion are controlled by the joint owners. True commons can break down, but, unlike open-access property, common property owners have greater ability to manage conflicts through shared benefits and enforcement.

Private property can be both excludable and rival. Private property access, use, exclusion and management can be controlled by the private owner or a group of legal owners.

Property income refers to profit or income received by virtue of owning property. The three forms of property income are rent, received from the ownership of natural resources; interest, received by virtue of owning financial assets; and profit, received from the ownership of capital equipment. As such, property income is a subset of unearned income and is often classified as passive income. There are types of economic benefits. Further these forms of property and property income also apply to virtual property or virtual space and also virtual rights.

Property may be broadly classified into two types, private property and common (public property). The term private property usually applies to rights held by individuals or groups acting in their own interests. The term 'public property' refers to rights held by the community at large and administered by individuals or groups acting as agents of the community. These two types of property differ in the focus of ownership as well as kinds of property rights exercised.

Private property again may be classified into two types: individual property and collective property. In individual property, the control is vested in an individual. Collective property may take various forms depending on the collective entity having ownership and control. The entity may be a private corporation, or a quasi-public corporation and a public corporation.

The private property may be distinguished from public property in a number of ways. Private property is owned by a person or group of persons, whereas public property is owned by the community. Private property is usually used by its owner for his own good, while public property is used for public good. Private property is regulated by the laws of the State, while public property belongs to the State itself and not subject to regulation by any external group. Personal property generally refers to moveable objects whereas real property refers to property that is fixed permanently to one location.

Types of property rights include the property license right, a freehold right, a leasehold right, an easement right, and an adverse possession right.

In the case of a license right, a person may give license to another person the right to use his/her property. However there is no transfer of interest and only permission for a specific purpose is granted on the property. A person having the property license may have the right to use the property based on the terms of the license given by the licensor.

For a freehold right, the owner may have complete right of ownership over his land. He or she can use the property for desired purposes and can also dispose away the property as per his or her wish and there are no restrictions over the use of the property.

For a leasehold right, a person has been granted a property on lease for a specific purpose. The lessee, has every right to use the property for the specific use and can use the property only for the period mentioned in the lease agreement. The lease will be governed by the terms of the lease agreement executed between the lessor and lessee. The lease period will be fixed and the lessee can use the property with the lessor's approval.

An easement right is a right to use another's property, wherein, a right in which owner of a particular land enjoys over an adjacent property, which he does not possess. It is the right over a property belonging to someone else and not to the person claiming easement.

For an adverse possession right, the right of ownership of premises can be changed. In case another person takes possession of the property without compensation in a manner that the owner's position will be altered and the person trespassing will have a right over it for a specific period.

The different categories of property rights can be summarized in the following table:

TABLE 1

Property Regimes

| Regimes | Ownership | Owner Rights | Owner Duties | Access |
|---|---|---|---|---|
| Private Property | Individual | Socially acceptable and access control | Avoid socially unacceptable use | Closed |
| Common Property | Collective | Exclusion of non-members | Maintenance - restrict the rate of use | Group members only |
| State Property | Government | Determine Rules | Maintain social objective | All |
| Open Access Resource | None | None | None | All |

The relationship between property, owner and property rights can be seen in the following table:

TABLE 2

Ownership and Real Property

| Subject | Owner | Natural Person |
|---|---|---|
| | | Juridical Person |
| | | Company |
| | | State |
| | | Municipality |
| | | etc. |
| Right | Ownership Right | Use |
| | | exclude |
| | | Transfer |
| | | Forever |

TABLE 2-continued

Ownership and Real Property

| Object | Land/Property | Parcel(s) of land |
| --- | --- | --- |
| | | Fishing in water |
| | | Water area |
| | | Common for property |

Individual Use Cases

Individual property rights are those things that an individual or consumer should be able to control, legally, morally or otherwise, whether it be in the physical world, the virtual world, or the combination of both. Examples include: physical and intellectual property, other ownership rights, individual filtering, a persona, and personal rights and freedoms.

An xR registry may enable a property owner to control or potentially lease out their property for AR uses. For example, a homeowner can allow someone to advertise on their property (similar to virtual billboard). However, a property owner should own such rights for advertising if on property owner property. Not only should the property owner be able to control the virtual experience of their property, but the property owner should also be able to monetize their personal property (or otherwise transact for something in exchange). A property owner should also be able to lease such virtual space to a renter, including ability to set parameters, rules, policies associated with what is allowed as well as what should be prohibited.

A property owner may be enabled to prevent unauthorized uses such as preventing non-authorized users from invading their personal property, including placing advertising at the property owner property, or preventing others from putting a virtual billboard above their property that says "sex offender" or "child abuser" or "homo" or any disparaging or non-authorized message on the outside of the property (virtual or otherwise) as someone passes by. A property owner should be able to make or control the virtual experience consistent with their desire (views, values, business intent, legal boundaries etc.).

An owner may be enabled to prevent unauthorized, unapproved promotions or messages, including promotion or advertising of false, disparaging, or illegal messages. A property owner may be enabled to ensure tenants are legally compliant and consistent with the rights that have sublicensed to them. Finally, an owner may be enabled to prevent a "land grab" that is likely to happen with random third parties trying to capture and sell virtual land associated with an individual physical property (including a home or property owner). In some cases, a property owner may be enabled to avoid paying any third party to register for property that should already legally be their virtual property.

An xR registry may enable ownership retention for rights other than physical property rights. For example, the registry may enable an individual to own and retain rights associated with a location (physical or virtual) separately from who may be the current owner of physical or virtual properly, based on such an agreed upon transaction. By way of example, it is commonplace in the physical world for an individual to retain oil and mineral rights after a property is sold. The possibility of retaining such rights in the virtual experience may also be enabled, subject to legality.

In one embodiment, the registry facilitates the ability to transfer rights to relatives, assignees, or heirs over time, the ability to allow attorneys or other agents or relatives to access property, the ability to track, maintain, hold, and sell rights separately from current owners, but still associated with property, and the ability to prevent someone or another entity from registering something technically already owned (e.g., "domain squatting").

The registry may also enable the ability to change and manage control over time, the ability of a homeowner or property owner to sublease out their physical property to another person, but retain control of the virtual property rights (e.g., restrict sublicense rights for a tenant), and the ability to prevent other users from trying to control, monetize, or otherwise inappropriately take advantage of the virtual real estate associated with the property for which someone already owns such virtual rights.

In some embodiments, an xR registry may enable individual filtering (including parental controls). For example the registry may enable the ability for a parent to control what their children see based on what parent(s) deem as appropriate, the ability to block as an individual or control as an individual, the ability to set varying levels of parental controls based on age or name of a child, the ability for parent to have automated age-graded filtering (e.g., the experiences may be different if kids are using or wearing a device versus if a parent is wearing it, or an adult child), and the ability for advertising or other to set general filters on what is allowed or do not allow in conjunction with a virtual property (e.g., a Muslim or LBGT supporter may want to restrict certain things such as hate speech or offensive material that they do or do not want shown on their property), the ability for individual to set up filtering guidelines. Similarly, other entities offering xR experiences may be able to define properties to enable such filtering.

The xR registry may also enable the ability for individual to not see or prevent others from seeing their child's face in an xR experience and have an option to have the face blurred or otherwise obfuscated, and the ability for individual to prevent viewing certain personally identifiable information about themselves in an xR experience (such as license plate numbers, badge, etc.).

The registry may also enable the ability to prevent against unauthorized uses such as preventing children from seeing promotions, advertising, or information related to porn, strip clubs, alcohol, tobacco, guns, etc. (as a property owner or as the parent of the children), preventing children from viewing such experiences while in public places, such as restaurants, preventing unwanted promotions, advertising, or other information related to advertisement, and preventing certain experiences or preventing their children from accessing them, such as virtual strip clubs or other virtual experiences and games that are deemed inappropriate by the parent.

The registry may enable individuals and entities to assert more control over their persona, such as enabling the ability to prevent others from overlaying information about an individual that may deemed inappropriate by the individual (e.g., inappropriate or disparaging graphics), and the ability to control (and potentially monetize, when appropriate) an individual's brand and likeness, the ability to automatically police and track usage of an individual's likeness and brand(s) using artificial intelligence (AI)/machine learning, or other forms of automated enforcement. In one embodiment this may include simulating or spoofing a particular location or other characteristics including a persona and reviewing the returned object returned for compliance. The review could include verification if an object is presence or no objects are returned. Further this could include verification of objects returned through object recognition, facial recognition, and text verification or translation, including checking for vulgar or inappropriate material, to name a few.

The registry may also enable the ability to prevent against unauthorized uses such as preventing others from overlaying information about an individual (such as a child in case of a parent) that may deemed inappropriate, preventing one teenager from "slut shaming" another teenager, or a grade-schooler from labeling another student, and preventing xR bullying of children that may live at a house or adults of what other people are posting about them.

The registry may also enable the ability for a celebrity or someone famous to allow (or prohibit) the posting of their identity on their house so people can (or cannot) find them by just be driving by. In cases such as AI, the registry may enable the ability to prevent others from inappropriately or subversively using an individual's personally identifiable characteristics such as look/face, voice, visual persona (likeness), fingerprint, retinal scan or ANY other brand or likeness (legal or not) associated with the individual and uniquely identifies the individual. Finally, the registry may enable individuals to prevent others from trying to spoof someone they are another individual (look and feel, voice recognition, retinal/fingerprint scan, etc.) to gain access to secure data of such individual (banks, passwords/software accounts, financial institutions, etc.) or spoof someone into thinking they are someone else.

The registry may also enable individuals to protect personal rights and freedoms such as the ability for an individual or group to fully control and exercise rights to free speech and other legally or constitutionally granted rights, and the ability to prevent any third party from restricting an individual's personal rights and freedoms in an xR experience, especially things like free speech.

Business Use Cases

Business property rights may refer to those things that a business entity or business owner should be able to control, legally, morally or otherwise, whether it be in the physical world, the virtual world, or the combination of both. One example of this is a business owner who wants to control (and potentially monetize) their place of business by promoting their own products/services or wants to lease their space to a third party (relevant, complementary, highest bidder, other) so they can monetize by property. Another possibility is a business owner who wants to control who can promote/advertise to enforce things important to them (brand, family values, non-competitive, etc.).

A building owner may also want to lease out their property for xR uses. They may be willing to allow their tenant to advertise on their property (similar to virtual billboard) when someone is in their place of business (and only for their place of business). For example, an individual owns an ice cream shop and has considerable foot traffic (and eyeballs) waiting for ice cream. As such, they would like to lease their xR property to advertisers that would be willing to access their foot traffic and customers (such as complementary stores in the same business complex).

The property owner may also want to control (or delegate) monetization their property (or otherwise transact for something in exchange). They may also have multiple tenants or businesses on their property, and each should be controlled and tracked separately.

A business owner may want to offer flash sales, store discounts, promote certain items during certain times when the shop is not open for others that are still open during that time. One example of this is a business owner wanting to allow or prohibit particular games in their place of business. They may also want to control when, how, or why such things are allowed.

The business owner may want to generally allow (or prohibit) "tiers" or types of experiences in their place of business. They may want explicit approval on an individual experience or application basis. They may also want to enable certain keywords or catch phrases to be associated with their place of business to make it easier to find and let people know what types of capabilities, services, and products they offer.

Business owners may also want to prevent against unauthorized uses of their property. For example, a property owner may want to prevent non-authorized users from utilizing their property, including placing competitive advertising or billboards in which they do not share in the revenue from. They may also want the ability to access and utilize the virtual space associated with the leased physical space to be of value to their tenants.

Property owners may also want to prevent someone putting up virtual advertising that is inconsistent with their businesses, such as pornography or disparaging or non-authorized message in or on the leased spaces of their tenants (virtual or otherwise).

Property owners may wish to prevent unauthorized xR experience from happening in their place of business, such as particular games that might interfere with business, or competitive, inappropriate, or pornographic content. Additionally, property owners may not want to allow inappropriate (adult) experiences in their family restaurants. A business owner may also want to prevent their competitor from promoting or undercutting their products and services in their place of business, such as an electronics store.

An xR registry may also be relevant for advertisers. For example, an xR registry may facilitate an advertiser who may want to put up virtual billboards on public or private property and may want to pay a local city, property owner, or business owner for the right to do so. Similarly, the registry may enable an advertiser to create promotions and advertisements that follow specific requirements, but are also consistent with the rights granted by the owner of the property.

An xR registry may enable a home or business property owner to sublease out property (and potentially the management thereof) to a business entity to represent the rights or resell (potentially subject to certain rules/restrictions). A property owner may want the ability to place restrictions on time, dates, content types, etc. The property owner may want to do this while preventing certain unauthorized uses. For example, the purpose of an xR experience requirements may be to protect the uncluttered and unspoiled aesthetics of the area, while allowing for the identification of businesses and community activities. A sign ordinance may protect the public from visual pollution and hazardous conditions that can result from commercial and private signs which are unsafe, obscure the vision of motorists, create dangers to pedestrian traffic, or which compete or conflict with necessary traffic signals and warning signs. An xR registry may enable advertisers to present advertising in a way consistent with these regulations.

There are several possible tiered ownership scenarios that may be relevant to an xR registry. For example, a business owner may wish to allow tiers of ownership or multiple parties to participate in control of both their physical and virtual property. These may include: business owner, building owner, landlord, lessor, renter/lease, or a home owners association (HOA) manager (in case of real estate). The business owner may wish to be able to delineate from different types of properties, including at the highest levels, what is private vs what is public. Some restrictions on tiered ownership might include preventing certain kinds of unauthorized uses including: preventing guests of homes, or those trespassing vs. those that have legal right to live on the property.

Advertising in this xR world may be different than in the current physical environment. AR-based experiences, for example, must persist in the real world across space, time and devices. Persistence means something can be created in the past and in real-time and then combined into new experiences. Therefore, tracking and integration with next-generation ad-servers need to take this into account, including how long someone is engaged, with which portions of the experience, and how they are engaged (or how it changes over time). The registry may integrate with systems for metrics, measurement, billing, analytics over time. This includes how often an object may be viewed by a given person or across all viewers.

Advertising may be subject to various restrictions. For example, signage rights and regulations (relating to advertising or otherwise) may bridge both physical and virtual environments. These regulations may enable a balance between the need for identification of businesses and community activities and the need for preservation of the city's scenic qualities. They may place places reasonable limits pertaining to the time, place and manner which include the appropriate locations, sizes, quantity, and construction and illumination methods of signs. Signage regulation may protect the public from visual pollution and hazardous conditions that can result from commercial signs which are unsafe, obscure the vision of motorists, create dangers to pedestrian traffic, or which compete or conflict with necessary traffic signals and warning signs.

In a commercial context, xR experiences may include commercially useful metadata such as hours of operation, or a building directory of tenants and services. Ability to locate and guide guests to bathrooms, conference rooms, kitchens, lobby's etc. Further, this can include building exits in the event of an emergency, or general exits of a building or parking structure.

Some businesses may create VR "maps" of their facilities. They may have sensitive facilities and upon seeing the virtual walk-throughs of their facilities, they may determine that the walk-through data is sensitive, and how easy it would be for someone to replicate some of their processes if they had access to this data. For example, it might be necessary to create a registry for tracking and controlling AR/VR walk throughs of homes. Considerations about how such a registry would be stored must be considered.

A business owner may want to create a certain brand, look and feel for their business, and they may not want others to overlay information about their business that they may deem inappropriate or inconsistent with their place of business. They may want to fully control (and potentially monetize when appropriate) their brand and likeness. The business owner may want to the ability to automatically police and track usage of their likeness and PR brands using AI, machine learning, or some other form of automated enforcement.

With respect to branding, the business owner may want to prevent certain unauthorized uses as well. For example, the business owner may wish to prevent others from overlaying information about their business that they may deem competitive or inappropriate about their place of business ("terrible service"). With respect to AI the business owner may wish to prevent others from inappropriately or subversively using their business characteristics or brand or likeness (legal or not) in a way that is not authorized. The business owner may also wish to prevent others from trying to spoof them to gain access to their customers or present themselves as representing the business.

Government Use Cases

Government property rights (or governing property rights) may refer to those rights that a governing entity should be able to control (regulatory, legally, morally or otherwise) whether it be in the physical world, the virtual world, or the combination of both. Examples include controlling or restricting rendering of adverse content near sensitive areas, restricting rendering of adult content near schools, and controlling or restricting promotion of gun, tobacco, alcohol, marijuana near schools or family restaurants. Government property rights may apply to all potential devices, including phones, glasses or cars' heads-up displays.

Government may also want to control a persona. For example, a local government may want to lease public property to advertisers or gaming companies, enforce trespassing laws for constituents as it pertains to xR, or enforce norms and standards (including zoning).

Governments may also want to separate military bases and other sensitive areas from other locations (like a national forest). However, a military entity may still benefit from registry control, especially to determine what experiences are allowed, who can experience them, and on what devices.

As another example, a government entity may want to prevent xR experiences from being located on railroad crossings, at intersections, or certain traffic areas where they could create a safety hazard. A registry may be able to prevent these hazards as well as facilitate enforcement of virtual trespassing.

An xR registry may enable a government entity to engage in monetizing of public property (i.e. community parks), time slicing of xR property ownership to increase revenues, keeping people out of dangerous situations (e.g., no AR in the middle of a busy street, no invading or trespassing citizen property, disabling AR distraction for drivers), and regulating use of xR near particular locations.

Area specific regulations may apply to schools (e.g., no marijuana ads), residential (single-family or multifamily use), commercial areas (for activities like retail stores and offices), industrial areas (used for manufacturing purposes), agricultural areas (for farming activities), and recreational areas (for recreational activities).

Government entities may enforce zoning restrictions of displays such as billboards (both physical and virtual). In some cases, an xR registry may enable the ability to apply AI or machine learning to autonomous vehicles to determine if such displays are within code and in appropriate locations (i.e., mapped into 'tiers' of government restrictions, including new variables such as spatial, time, and identify variables. The registry may also enable auto-enforcement and reporting. For example, head-up displays (HUDs) in cars are another form of VR device that may utilize the xR registry. A government entity may attempt to regulate the use of HUDs. For example, the entity may attempt to control when things are displayed by location (i.e. not in intersections).

A government entity may also use the xR registry to maintain civic records relating to AR/VR spatial data (some of which may not exist yet). For example, a government may wish to conduct a spatial survey (e.g., using LIDAR or texture photography).

In a civic context, xR can provide a mapping to metadata that allows the environment to "speak for itself" about available resources, hours of operation, and permitted uses. For example, an environment can notify nearby people about health, safety and emergency services. xR can also provide real-time metadata warning of on-site hazards, remediations, and emergency contact details.

Health and safety related applications may be implemented without ads in order to avoid any safety impacts. Thus, the registry may be used to control whether things are displayed over authorized government signs. Civic xR experiences may include pointing out the nearest hospital, urgent care, or pharmacy from a gaze point of view, identifying a location of the nearest automated external defibrillator (AED) devices, identifying a location of nearest emergency kit, and providing emergency alerts.

The xR registry may support a generic framework (e.g., a master registry of multiple of sub-registries) whereby governmental regulations can be automatically applied and enforced. This includes the ability for an individual to create and implement their own registries. These sub-registries may be utilized for building codes, billboard codes, and rules for preventing signs within certain locations/areas. In some cases, enforcement for existing rules may be supplemented in xR. For example, a city, county, state, or other government entity may ensure that apps to subscribe to a government service.

Examples of regulatory regimes that may be enforced in an xR environment include zoning, legal compliance (e.g., against defamation), military regulations, and driving laws. In some implementations, all driving laws may be enforced in a virtual environment.

An xR registry may also be used to increase the accessibility of an environment. For example, a government entity may maintain a registry of all stop lights that include accessibility features (such as audible alerts).

Other potential compliance areas include airspace regulations, surveillance (electronic, physical, xR), permissions and tracking, and access tracking (i.e., who gets access to what locations, and what permissions may exist in those locations). Other examples include consumer privacy regulation (electronic, xR separate from electronic, internet privacy, tracking, physical, etc.), antitrust regulation, control over private companies, food and drug regulation, occupational safety, environmental regulation, monetary policy, fiscal policy, utility regulation and service, media regulation (i.e., regulating the electromagnetic spectrum), net neutrality regulation, free speech, telephonics, and trade regulation. Additionally, a government entity may use an xR registry to notify users of government facilities (i.e., buildings and parks) of hours of operation and rules for public spaces.

The use of an xR registry also has a number of implications for enforcement and protection of privacy related rules and regulations. The concept of xR (especially AR) may depend on the ability of the device to record and analyze the environment in real time. While constitutional law may allow for such recording in the name of public interest, the constant recording of a rendering device may make it difficult to do so without also recording outside of the public domain. People may have an expectation of privacy in certain areas or domains. An xR registry may be utilized to enable rendering devices to operate without violating people's expectation of privacy.

For example, individuals may have boundaries or limits to the amount or type of information that may be possessed by others. These limits may be represented in the registry rules. In some examples, facial recognition may be used to gather and present individual data (e.g., social media, criminal record, and marital status) about others that are viewed through a rendering device. An xR registry may be used to filter and regulate the presentation of this data. Thus, privacy-compliant image capture solutions can be deployed to temper the impact of constant filming on individual privacy.

Additional Use Cases

An xR registry may facilitate experiences and transactions in a wide range of other industries. For example, in the construction industry the registry may be used for such things as facilitating compliance with construction and building code compliance and designing and visualizing projects that utilize. There may be a demand to determine whether such designs fit local codes and zoning requirements. An xR registry may also be used as a database to store information regarding compliance with different with tiers of zoning laws, and to apply AI or machine learning to determine if a specific build is compliant.

Other applications may include facilitation of architecture, support for AR cloud construction models, and creation of a construction plan database. This may enable interested parties to track plans and progress for construction projects.

The creator or owner of the plans may have the ability to retain rights to these plans and make them accessible only through a purchase of rights transaction. In some instances, an xR registry may include plans for buildings in a local area to facilitate other services. For example, a fire department could use plans stored in an xR database to obtain information about a fire or rescue situation prior to arrival on site, or during an operation via a display on a protective visor. Thus, for example, a fireman may be presented information regarding where all of the doors and other exits for a building are to facilitate a rescue. This material may be classified or restricted to only be accessible by a governmental entity, such as a fire department, a police department, or FBI.

An xR registry may also be useful to a new owner of a building. For example, the new owner may obtain information regarding where all studs, electrical, plumbing, and other connections are in the home. In some cases, the construction use cases may be integrated with the government compliance use cases, e.g., for zoning and regulation of buildings.

An xR registry may also be used in an automotive context. For example, the registry may facilitate controlling or restricting display of information and advertisements on a car's HUD. Similarly, the xR registry may prevent rendering or activity at intersections (for human drivers). For self-driving cars, the xR registry may be used to help vehicles determine relative location and manage traffic considerations. That is, an xR registry can allow a vehicle to interactively discover the metadata necessary to guide itself through an unknown or dynamic environment.

The xR registry may also be used to prevent uses such as people from playing or viewing distracting games or entertainment while driving or advertisement of certain products at certain times and locations (such as at a railroad crossing or near schools).

An xR registry may also be used to facilitate the operation of the internet of things (IoT). For example, the registry may include AR schematics for IoT enabled devices or other household appliances. These may allow you to interact with the device for control, modification, or purchase of related goods and services. The registry may also facilitate the ability to auto-detect objects and present xR applications accordingly.

The registry may enable guided repair experiences for some objects, or menus for accessing more information about objects. The registry may include information to facilitate auto-identifying parts based on artificial intelligence (AI) image recognition or other identifying data.

In some examples, an xR registry may be used to prevent "rogue", malicious, or unwanted applications. For example, applications may be registered and authorized prior to use. This may ensure that people don't create fraudulent or misleading applications. For example, applications may be registered using a blockchain, or other immutable database. Information that may be verifiable via the registry include xR experiences and objects related to user manuals and instructions.

Other uses for the xR registry may include utilities that can create a 'digital twin' of critical facilities, healthcare facilities that generate a medical overlay for use during procedures, and entertainment providers that can control delivery of entertainment experiences. Yet other uses include xR game permissions, virtual museums, legal professionals, art and literature, archeology, architecture, retail, education, search and rescue, security, military training, navigation, workplace applications, tourism, live event broadcasting, and translation services.

FIGURE DESCRIPTIONS

FIG. 1 shows an example of an extended reality (xR) registration system 100 in accordance with aspects of the present disclosure. The xR registration system 100 may include consumer 105, user device 110, internet 125, xR Registry 130, and xR Warehouse 135. The illustrated xR registration system 100 may be an example of, or include aspects of, the corresponding elements described with reference to FIG. 2.

Consumer 105 may be an example of, or include aspects of, the corresponding elements described with reference to FIGS. 2 and 3. User device 110 may be an example of, or include aspects of, the corresponding elements described with reference to FIGS. 2-5.

User device 110 may include rendering device 115 and secondary device 120. Rendering device 115 may be an example of, or include aspects of, the corresponding elements described with reference to FIG. 5. Secondary device 120 may be an example of, or include aspects of, the corresponding elements described with reference to FIG. 5.

A rendering device 115 may represent a system for rendering 3D images, which may be incorporated into a device such as a pair of glasses, a vehicle windshield, or other viewing device. In the event the rendering device 115 is a phone or tablet, the phone or tablet may use the on-board components (i.e. a global positioning service (GPS), Cellular or Wi-Fi device) for location and also communication over the Internet 125. In one implementation the communication with xR registry 130 Services may be over Transmission Control Protocol (TCP)/internet protocol (IP) and using Simple Object Access Protocol (SOAP) or Representational State Transfer (REST) application programming interface (API)s to make the request and receive the response.

The rendering device 115 may be coupled with a secondary device 120 such as a cellular phone or Wi-Fi device that has the ability to communicate over the internet 125 to servers containing the xR registry 130, xR Warehouse 135 and associated services. The coupling may be over bluetooth or some other short-range communication to an application that could be running on a phone. In one embodiment, the GPS of the phone or cellular/Wi-Fi device could use triangulation to determine the location of the consumer 105 that can be included in the xR experience 140 content request.

In general, one of many real-time location services (RTLS) could be employed. Real-time location systems are based on wireless technologies, such as Wi-Fi, bluetooth, ultrawideband, Radio-frequency identification (RFID), and GPS. Further a compass for collecting direction may also be in a device.

The rendering device 115 may be a device used by consumer 105 that renders the xR experience 140. Rendered experiences 140 can include one or more of the following: capability, visual, audio, touch, smell and more.

At a basic level, rendering can occur where computer-generated (CG) information can be added to a human's visual field via a handheld device, glasses, contact lenses or some augmentation of the path of visual input. When CG information is added in this manner, all CG light is additive to natural light conditions. Alternatively, a capture device of some kind can capture the natural setting and associated light and process it with the added CG material to create a new synthesized view.

Examples of rendering devices 115 include phones, handsets, tablets, glasses, and contact lenses (which may contain the elements for display embedded into the lens including integrated circuitry, LEDs and an antenna for wireless communication). xR enabled contact lenses may allow the user to blink to control an interface for recording purposes. They may also be linked to a smartphone (e.g., secondary device 120) to review footage, and control the rendering device 115.

Other examples of a rendering devices 115 may include a HUD (e.g., in a vehicle or helmet), retina displays (i.e., including virtual retinal display images are scanned directly onto the retina of a viewer's eye), glasses, cameras, drones, and projection devices.

Components of the rendering device 115 may include a display, a location capture system, three dimensional semantic maps (including occlusion meshing, depth capture, cameras, depth sensors, and photo telemetry to sense real-world and create depth map), a Visual Inertial Odometry (VIO) system (i.e., software that tracks a position in space), and a Simultaneous Localization And Mapping (SLAM) component (i.e., the computational system for constructing or updating a map of an unknown environment while simultaneously keeping track of an agent's location within it).

Other components of the rendering device 115 may include a gaze tracking component, an image recognition component, a generator of geospatial data, and a local processing unit. In some examples, rendering device 115 may use one or more of the following tracking technologies: digital cameras and/or other optical sensors, accelerometers, GPS, gyroscopes, solid state compasses, RFID. These technologies offer varying levels of accuracy and precision. They may also provide information related to the position and orientation of the user's head and user's hands. The rendering device 115 may also include speech recognition systems that translate a user's spoken words into computer instructions, and gesture recognition systems that interpret a user's body movements by visual detection or from sensors embedded in a peripheral device such as a wand, stylus, pointer, glove or other body wear.

In some cases, (i.e., to compensate for a lack of local computing power) data may be offloaded from rendering device 115 to a distant machine. Computation offloading may introduce additional constraints in applications, especially in terms of latency and bandwidth.

A rendering device 115 may also account for circumstances in which they are not powered on, and circumstances where they interact with other devices to create shared experiences (but in which the other devices may have the same capabilities).

The xR registry 130 may retrieve one or more of the xR experiences 140 from an xR warehouse 135 and return the appropriate xR experience 140 for the device. In another implementation the xR registry 130 may return a pointer or reference to an xR experience 140 to the requesting device and then the requesting device can make a subsequent call directly to the xR warehouse 135 to retrieve the xR experience 140.

In one implementation there may be multiple xR warehouses 135 that the xR experience 140 could be retrieved from. The xR warehouses 135 could be separated by user device 110 manufacturer, by advertiser, or be spread across the internet 125 where each xR experience 140 owner can host and deliver the xR experiences 140. The xR warehouse 135 may be stored in many types of storage devices and technologies including a file system, relational database, NOSQL database such as MongoDB, or a blockchain distributed ledger.

In some cases, aspects of an xR experience 140 may depend on the capabilities of the rendering device 115. For example, the rendering device 115 may determine a resolution level of the rendered xR experience 140. In other examples, the level of resolution or rendering quality that that can be applied to the xR experience based on a rule, right, or actor.

For example, the level of available resolution (or rendering quality) can vary based on level of detail/quality, size, environmental and technical constraints/limitations, other users, business models and more. The level of available resolution can also vary based on permissions, transaction value (what you are willing to pay for or watch ads to enable), and proximity. Other constraints or parameters include the dimensionality of the experience (i.e., 2D vs 3D), a bandwidth constraint, a level of detail around and object, textures, a pixel resolution of the rendering device 115, reflection data and lighting, shadows, ray tracing and incoming light, and real-time rendering issues (which may also be tied to the capabilities of the rendering device 115).

In some examples, resolution may be determined by proximity and viewing angle, (e.g., to add realism and save processing power, closer items and items within the line of sight might have a higher resolution). A rendering device 115 may also have the ability to manually or automatically zoom (e.g., based on viewing time). In some cases, resolution may be selectable by the consumer 105, or the provider of the xR experience 140 (i.e., higher resolution may come at an increased charge, or with more advertisements).

In some cases, it may be desirable to change the xR experience or have different xR experiences based on the brightness of the location. This could be due to whether the sun is out, it is at night, or just based on the ambient light of the location. As this could change over time and updated xR experience may be requested if the ambient light was to change over a period of time, or even based on the proximity or direction. For example, if a person is looking into the direction of the sun vs. looking away into a shadow.

In some cases, it may be desirable to make something look closer than it really is, or vice versa. This provides the ability to change a user's perspective in real-time (and not be bound based on my current location, proximity or other).

In some examples, the resolution of an xR experience 140 may depend on qualities or levels of SLAM (i.e., mono-SLAM depth maps and cameras may be limited by the vantage point of cameras). Resolution may also be impacted by entity permissions, user profiles/personal preferences, privacy guidelines, legal rules, business models, transaction value, orientation (as defined above) and other may be used to enable/disable different resolutions.

xR registry 130 may be an example of, or include aspects of, the corresponding elements described with reference to FIGS. 2-6. xR warehouse 135 may be an example of, or include aspects of, the corresponding elements described with reference to FIGS. 2-4.

The xR registry 130 stores all rules, rights and states of ecosystem components and the ability to reference, link with, and associate such with identity DB, xR experience 140, xR warehouse 135, and other systems in the ecosystem. Capabilities of the xR registry 130 include storing a personalization, rules, governance, filtering, or state that ties into all of listed ecosystem components. This may include rules for individuals and entities, as well as rights and enablement applied on top of xR warehouse 135 and other raw databases/systems.

Capabilities of the xR registry 130 may further include filtering and time-based rules and properties described herein. The xR registry 130 may supports either a centralized database or a distributed ledger approach (i.e., a blockchain) for storing xR experiences 140.

In some examples, xR registry 130 may interact with a blockchain to manage rights and geo-spatial information in real-time. For example, the blockchain may engage in the functions of recording, authentication and authorization of transactions, or other if a user has appropriate rights. In some cases, the blockchain may be used to store privacy settings, or ensure that an appropriate actor has ability to manage such rights and preferences. Further the blockchain may also be used as a smart contract by the property owner to sublicense the virtual property.

The xR registry 130 may also use a blockchain to ensure the system is properly filtering based on such privacy rules, regulations and third-party data sources. Thus, users may be able to securely determine and manage the status of rights and how that may impact what may and may not be rendered.

In some examples, the xR registry 130 may interact with a third-party rights database (not shown). A third-party rights database may represent one or more separate systems (of which there may be more than one) that store information related to rights and ownership for a particular object or one or more properties of an object.

Such separate third-party systems can be used for authentication and authorization and may facilitate the ability to tailor, define, implement, and enforce rights and rules. Examples of third-party rights databases include physical property ownership databases (property title, records, MLS, etc.), social media networks, lease/rental databases, and identity databases (i.e., for birth certificates, social security, credit records, passport information, state identification and license information, facial recognition and other biometrics, and law enforcement information). Other examples include likeness databases (for individuals, brands and places), patent databases, trademark databases, copyright databases, privacy databases, domain registries, family registries, privacy rule databases, zoning law databases, and databases related to affinity groups.

Accessing these third-party databases may assist in determining which actors should be allowed (or restricted) from gaining certain rights in the xR registry. For example, if an individual owns the physical property of a home, it may not be appropriate for another individual to try to take ownership of (and 'squat' on) the virtual rights associated with that physical location. Thus, it may be useful to be able to properly identify an individual attempting to access the property.

Similarly, when it comes to enforcement and automated compliance, such third party databases can be used to improve the intelligence of such enforcement and compliance processes, and the data from these third party databases can be used to train automated processes and models on how to identify situations where someone is attempting to create or apply a right (or create an xR experience) that might be inconsistent with other types of ownership rights or compliance as identified in these third party databases.

The xR warehouse 135 may store one or more xR experiences 140. xR experiences 140 may be an example of, or include aspects of, the corresponding elements described with reference to FIGS. 2, 3, and 5. The capabilities of the xR warehouse 135 may include storing and identifying applications and types with references to other systems, and storing xR experiences 140 for the same associated reference in the registry may be different based on target Rendering device.

In some cases, the xR warehouse 135 may have the ability to tailor experiences based on the capability of a network (such as bandwidth), rendering device capability, value (has someone paid for premium version), or other potential limitations/factors. For example, it may select a resolution as well as a depth, tier, or level of experience.

An xR experience 140 may be provided to a consumer 105 based on a request, and the rules provided by the xR registry 130. In addition to the xR experiences, the xR Warehouse 135 may store semantic maps of the world associated with a location, times and parameters for when xR experiences are available, persistence information, and shared AR (i.e., how the xR experience is adapted based on multiple users).

In some examples, the xR warehouse 135 may include logic to incorporate information about the geometry of a scene or location or environment, information about objects in the environment, scalable and shareable RWDRS, spatial mapping capabilities. The xR warehouse 135 may also be able to create an maintain persistent point clouds that are aligned with real-world coordinates, and understand geometry and shapes of the real world, with high resolution to support occlusion and collision. The xR warehouse 135 may support large spaces to larger clusters, and may enable many users to contribute and continue to refresh and build the store of xR experiences 140 over time. In some examples, the xR warehouse 135 may also supply user notifications regarding the status of xR experiences 140.

Figure 2:
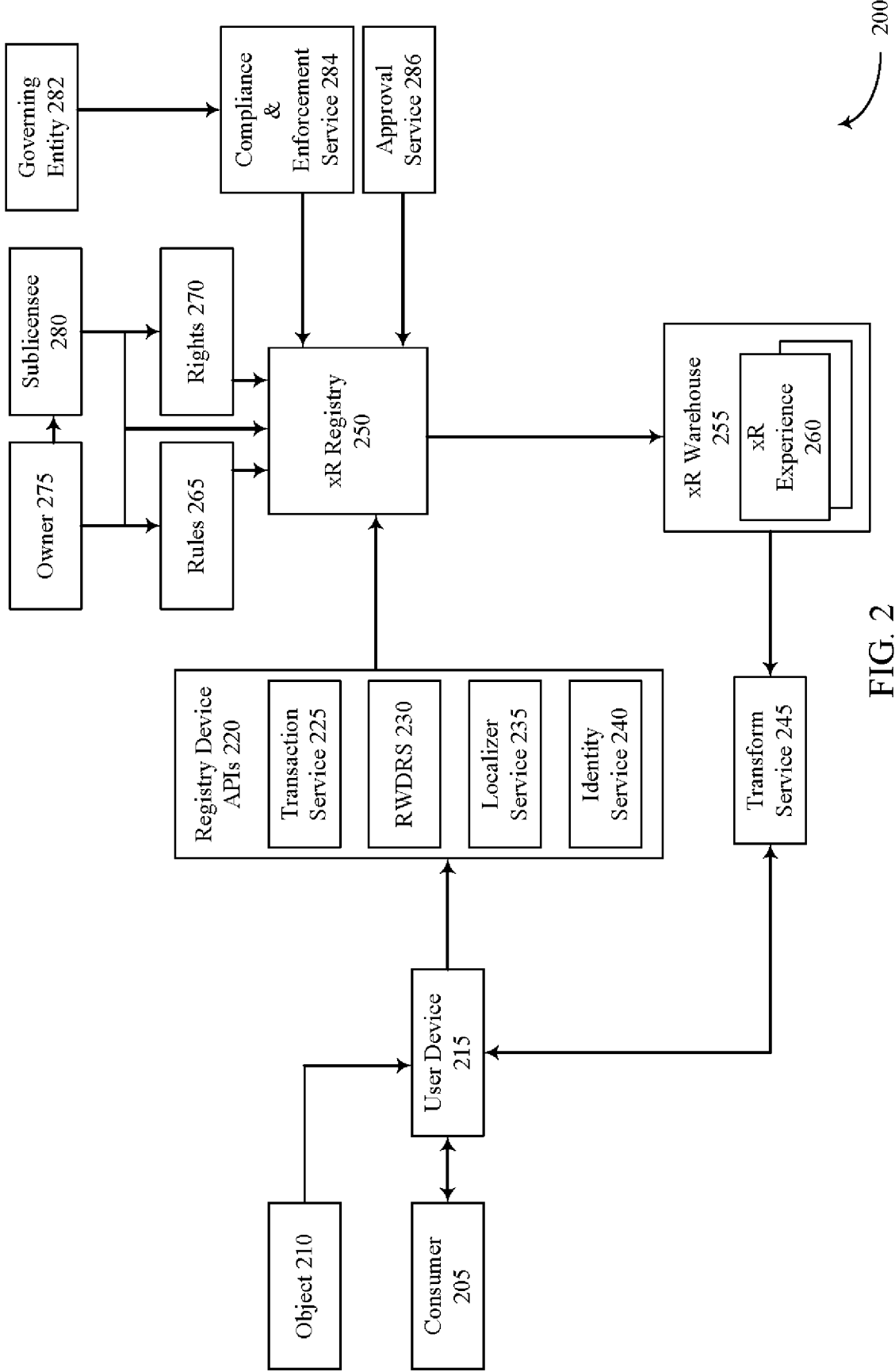

FIG. 2 shows an example of an xR registration system 200 in accordance with aspects of the present disclosure. xR registration system 200 may include consumer 205, object 210, user device 215, registry device APIs 220, transform service 245, xR registry 250, xR warehouse 255, rules 265, rights 270, owner 275, sublicensee 280, governing entity 282, compliance and enforcement service 284, and approval service 286. In some examples, a consumer input mechanism may be used as part of, in place of, or in addition to the user device 215.

xR registration system 200 and Consumer 205 may be an example of, or include aspects of, the corresponding elements described with reference to FIGS. 1 and 3.

Device 210 may be an example of, or include aspects of, the corresponding elements described with reference to FIG. 3. User device 215 may be an example of, or include aspects of, the corresponding elements described with reference to FIGS. 1, and 3-5.

Registry device APIs 220 may be an example of, or include aspects of, the corresponding elements described with reference to FIG. 4. Registry device APIs 220 may include transaction service 225, real world data representation service (RWDRS) 230, localizer service 235, and identity service 240. Transaction service 225, RWDRS 230, localizer service 235, and identity service 240 may be examples of, or include aspects of, the corresponding elements described with reference to FIG. 4.

The transaction service 225 enables transactions (financial, advertising, coupons, crypto currency, or other) associated with an xR experience 140. It may integrate with the overall xR ecosystem to provide a marketplace where actors place and fulfill orders.

Capabilities of the transaction service 225 include supporting transactions that occur when creating and/or updating the xR registry (to update actors, rules, rights, etc.) in addition to transactions directly associated with the xR experience. The transaction service 225 may also offer the ability for appropriate actors to create objects, rules and rights, and may provide enforcement based on relationship of identity to actor. Actors can also associate value using monetary, cryptocurrency, or other 'transaction' values. Value can be tracked using a distributed ledger (i.e., a blockchain), a relational database or using other means.

The Real World Data Representation Service (RWDRS) 230 stores image, video, depth maps or other recognition information that can be used to detect, identify and recognize an object or seamlessly map (and localize) objects at a location into a multi-dimensional xR experience.

For a fully immersive xR experience 140, the RWDRS 230 may not just recognize an object, but also "understand" the actual scene, the geometry of the physical environment, and the objects in it. RWDRS 230 may offer services that are persistent, always around, and aligned with real-world coordinates. It may incorporate geometry and shapes of the real world and provide support for ever-increasing resolution (as technology evolves over time) to support occlusion, collision and support for large spaces (which can ultimately be mapped to larger clusters). RWDRS 230 may also allow users to contribute and continue to refresh and build the capabilities of the service over time.

In some examples, the RWDRS 230 may enable a seamless blending of virtual content with physical environments. Technologies to enable such RWDRS 230 may include spatial mapping, LIDAR, drones, depth perception, stereo cameras, semantic mapping, image recognition, barcode and QR code recognition, and audio recognition (such as ability to recognize song and overlay lyrics, local concert information, etc.). In some cases, the RWDRS 230 may incorporate technology for the recognition of other senses, as well as incorporate other capture capabilities and camera types.

The localizer service 235 may be responsible for tracking and mapping the xR experience 140 against the surfaces/geometries of a particular location, either in the physical world against the physical surfaces at a Location (for an AR experience), against virtual surfaces in a 3D world (for a VR experience), or based on the orientation of the user or objects in the xR experience. Thus, the localizer service 235 may be capable of making the xR experience work at a range of angles, locations, and devices (to allow interaction of many users at the same time). Localizer service 235 may also be responsible for aligning content positions and/or orientations between multiple simultaneous viewers to create the illusion of shared xR experiences. The data for the 3D surfaces and the mapping of physical (and virtual) spaces to objects (used by the localizer service) comes from the RWDRS 230. The RWDRS 230 may also provide object recognition via multiple technical approaches.

A variety of technologies may be used for simultaneous localization and mapping (SLAM), which addresses the computational problem of constructing or updating a map of an unknown environment while simultaneously keeping track of an agent's location within it. SLAM techniques may include mapping and sensing.

Topological maps are a method of environment representation which capture the connectivity (i.e., topology) of the environment rather than creating a geometrically accurate map. Topological SLAM approaches may be used to enforce global consistency in metric SLAM algorithms. By contrast, grid maps use arrays (typically square or hexagonal) of discretized cells to represent a topological world, and make inferences about which cells are occupied.

SLAM mapping may make use of highly detailed map data collected in advance. This can include map annotations to the level of marking locations of individual white line segments and curbs on the road. Such systems simplify the SLAM problem to a simpler localization task, enabling moving objects such as cars and people only to be updated in the map at runtime.

SLAM techniques also use several different types of sensors. Different types of sensors give rise to different SLAM algorithms whose assumptions are which are most appropriate to the sensors. On one hand, laser scans or visual features provide details of a great many points within an area, sometimes rendering SLAM inference unnecessary because shapes in these point clouds can be easily and unambiguously aligned at each step via image registration. On the other hand, tactile sensors may create sparsely distributed data sets as they contain information about points close to the agent.

Sensor models divide broadly into landmark-based and raw-data approaches. Landmarks are uniquely identifiable objects in the world whose location can be estimated by a sensor, such as Wi-Fi access points or radio beacons.

Optical sensors may include one-dimensional (single beam) or 2D (sweeping) laser rangefinders, 3D high definition LiDAR, 3D flash LIDAR, 2D or 3D sonar sensors and one or more 2D cameras. Visual and LIDAR sensors may be sufficiently informative enough to allow for landmark extraction. Other SLAM may include tactile SLAM (sensing by local touch only), radar SLAM, and Wi-Fi-SLAM (sensing by strengths of nearby Wi-Fi access points).

Some approaches may apply quasi-optical wireless ranging for multi-lateration (RTLS) or multi-angulation in conjunction with SLAM as a tribute to erratic wireless measures. An other form of SLAM for human pedestrians may use a shoe mounted inertial measurement unit as the main sensor and rely on the fact that pedestrians are able to avoid walls to automatically build floor plans of buildings.

For some outdoor applications, the need for SLAM may be reduced due to high precision differential GPS sensors. From a SLAM perspective, these may be viewed as location sensors whose likelihoods are so sharp that they dominate the inference. However, GPS sensors may go down entirely or partially on occasions.

SLAM techniques may also include kinematics modeling. Kinematics modeling includes information about action commands given to a robot. As a part of the model, the kinematics of the robot may be included to improve estimates of sensing under conditions of inherent and ambient noise. The dynamic model balances the contributions from various sensors, various partial error models and finally comprises in a sharp virtual depiction as a map with the location and heading of the robot as some cloud of probability. Mapping may be based on the final depiction of the model.

As an example, for 2D robots the kinematics may be given by a mixture of rotation and "move forward" commands, which are implemented with additional motor noise. The distribution formed by independent noise in angular and linear directions may be non-Gaussian, but may be approximated by a Gaussian. An alternative approach is to ignore the kinematic term and read odometry data from robot wheels after each command. Such data may then be treated as one of the sensors rather than as kinematics.

In some cases, SLAM may take into account multiple objects. The related process of data association and computational complexity may involve the identification of multiple confusable landmarks. In some cases, SLAM processes may be posed in terms of multi-object Bayesian filtering with random finite sets that provide superior performance to leading feature-based SLAM algorithms in challenging measurement scenarios with high false alarm rates and high missed detection rates without the need for data association. SLAM may also take into account moving objects.

SLAM techniques may also utilize loop closure. Loop closure may refer to the process of recognizing a previously-visited location and updating beliefs accordingly. In some cases, algorithm errors can assign low priors to the location. Thus, loop closure methods may apply a second algorithm to compute some type of sensor measure similarity and re-set the location priors when a match is detected.

The identity service 240 stores identity and other personal information of actors in the ecosystem, including consumers 205, owners, sublicensees, and governing entities. Identity may be based on a self-sovereignty concept (as implemented via a blockchain) as well as using a centralized database approach. Identity can exist in both physical and virtual domains. Thus, the identity service 240 may provide the ability to link physical and virtual identities.

The transform service 245 may be used to 'transform' or apply filters and rules from the xR registry 250 to create the composite view that is actually rendered. This service may perform filtering (and could be part of xR registry 250, or separate from xR registry 250). The transform service 245 may take input from the xR registry 250, the rules 265, and the consumer choices, and may return what is to be rendered. The transform service 245 can also take output from the xR registry 250 and then perform transformation or apply rules.

Capabilities of the transform service 245 may include the ability to transform xR experiences 260 based on rules from xR registry 250 (at the time of an inbound request or at the time of an outbound response from the xR warehouse 255). For example, an intermediary may store personal preferences and apply the to the xR experience 260.

In some cases, the transform service 245 may apply computer vision algorithms to several objects in view to derive a multiplayer game capability. In this 'transform' there could be application of multiple filters and other algorithms. In some cases, it may be possible to distribute rendering, processing and/or transformation capabilities between the network and a rendering device.

The xR registry 250 may be an example of, or include aspects of, the corresponding elements described with reference to FIGS. 1, and 3-6. xR warehouse 255 may be an example of, or include aspects of, the corresponding elements described with reference to FIGS. 1, 3, and 4.

The xR warehouse 255 may include xR experiences 260. xR experience 260 may be an example of, or include aspects of, the corresponding elements described with reference to FIGS. 1, 3, and 5.

Rules 265 may be an example of, or include aspects of, the corresponding elements described with reference to FIGS. 3-5. Rights 270 may be an example of, or include aspects of, the corresponding elements described with reference to FIG. 4. Owner 275 may be an example of, or include aspects of, the corresponding elements described with reference to FIGS. 3-5.

Sublicensee 280 and Governing entity 282 may be an example of, or include aspects of, the corresponding elements described with reference to FIGS. 3 and 4. Compliance and enforcement service 284 may be an example of, or include aspects of, the corresponding elements described with reference to FIG. 4.

Figure 3:
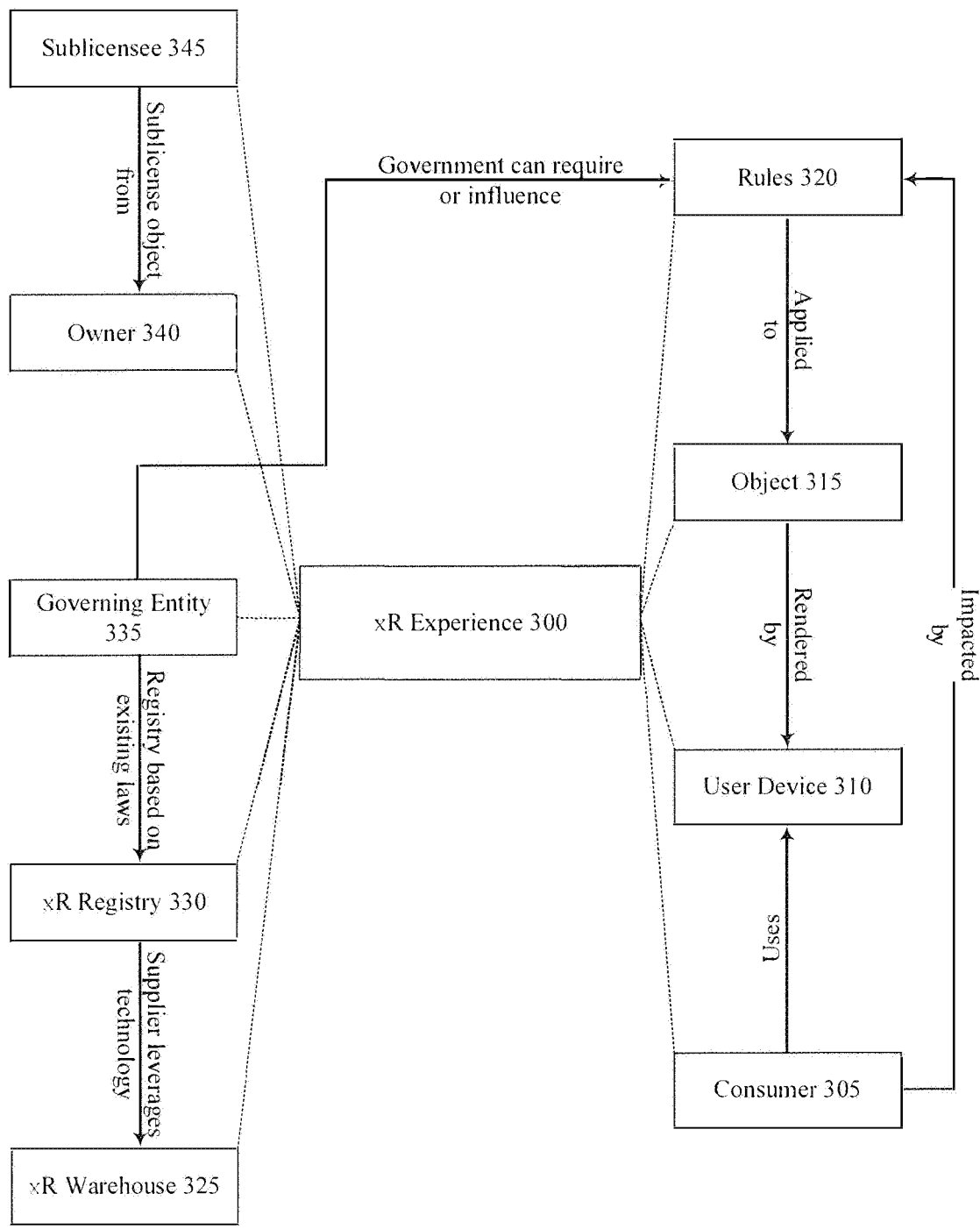
FIG. 3 shows an example of an entity relationship diagram in accordance with aspects of the present disclosure.

FIG. 3 shows an example of an entity relationship diagram in accordance with aspects of the present disclosure. The example shown includes xR experience 300, consumer 305, user device 310, object 315, rules 320, xR warehouse 325, xR registry 330, governing entity 335, owner 340, and sublicensee 345.

The consumer 305 may have preferences or settings that include rights and allowed actions. The allowed actions may include the ability to restrict (e.g., parental controls), hide, share, add, create, view, and own (or sublicense) an object 315. The rights may include the ability to create, own, rent, override, restrict, or disable.

The user device 310 may be a mobile phone, a vehicle head-up display (HUD), wearable glasses, contact lenses, or a projection device. The user device 310 may include components such as location capture components including a bluetooth beacon, a WiFi radio, and a GPS or other satellite positioning service. The user device 310 may also include hardware such as a camera, which may have functions such as occlusion meshing, depth capture, depth sensor and photo telemetry. A device software development kit (SDK) may enable integration with shared experiences and image recognition.

The object 315 may be either physical or virtual. In either case, the object 315 may include one or more location parameters. If virtual, the object 315 may include visual parameters such as opacity and proximity.

The owner 340 may have ownership of physical property such a house, building, washing machine, etc., or of virtual property. In some cases, ownership may be shared by multiple individuals or entities.

xR experience 300 may be an example of, or include aspects of, the corresponding elements described with reference to FIGS. 1, 2, and 5. Consumer 305 may be an example of, or include aspects of, the corresponding elements described with reference to FIGS. 1 and 2.

User device 310 may be an example of, or include aspects of, the corresponding elements described with reference to FIGS. 1, 2, 4, and 5. Object 315 may be an example of, or include aspects of, the corresponding elements described with reference to FIG. 2. Rules 320 may be an example of, or include aspects of, the corresponding elements described with reference to FIGS. 2, 4, and 5.

xR warehouse 325 may be an example of, or include aspects of, the corresponding elements described with reference to FIGS. 1, 2, and 4. xR registry 330 may be an example of, or include aspects of, the corresponding elements described with reference to FIGS. 1, 2, and 4-6.

Governing entity 335 may be an example of, or include aspects of, the corresponding elements described with reference to FIGS. 2 and 4. Owner 340 may be an example of, or include aspects of, the corresponding elements described with reference to FIGS. 2, 4, and 5. Sublicensee 345 may be an example of, or include aspects of, the corresponding elements described with reference to FIGS. 2 and 4.

Figure 4:
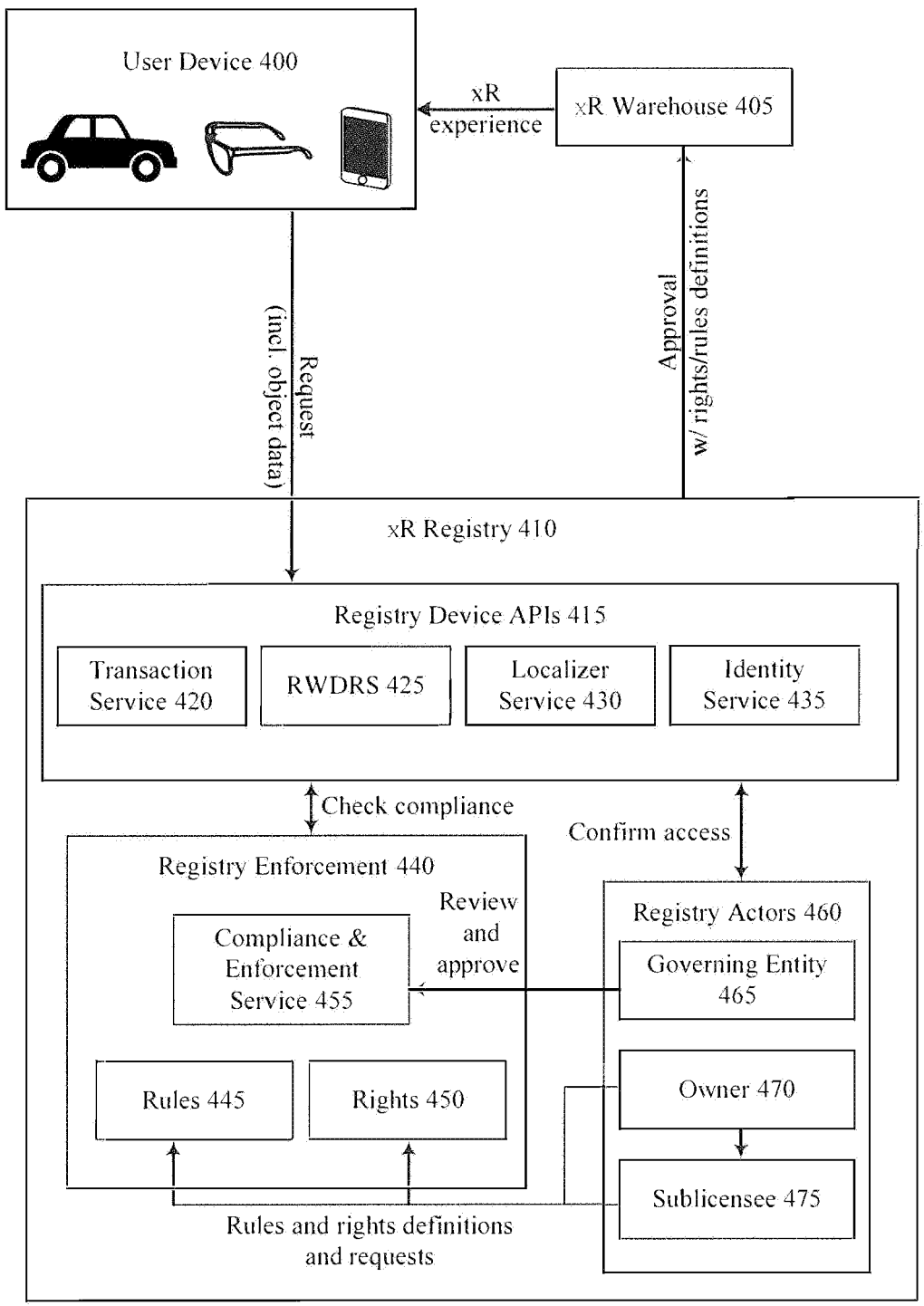
FIG. 4 shows an example of an xR Registry in accordance with aspects of the present disclosure.

FIG. 4 shows an example of an xR registry 410 in accordance with aspects of the present disclosure. The example shown includes user device 400, xR warehouse 405, and xR registry 410.

The user device 400 may include augmented reality (AR) eyeglasses, AR contact lenses, a mobile device or tablet, or an AR display in a vehicle. The hardware devices may run software applications, which may utilize an SDK exposed by the manufacturer. The user device 400 may communicate with the registry device APIs 415 exposed on the network via wireless communication link.

In some examples, the xR warehouse 405 represents third party software that runs on a public or private cloud. The xR warehouse 405 may render the xR experiences based on information received from the xR registry 410 and then pass the xR experiences back to the user device 400. In some examples there are multiple xR warehouses 405.

In some examples, the xR registry 410 may receive requests from the user device 400, and may return a set of definitions for the rules 445 and rights 450. The registry values may include an object table with information regarding a reference ID, URN, URI or File path, a device identifier, personal profile attributes (i.e. rating or minimum age requirements), a date updated, a physical rights owner, sublicensee information, object physical placement perimeter information, and a viewing perimeter (e.g., polygon shape of coordinates defining area). The registry values may also include a purchased rights table listing the purchased owner, the time frame length, time limitations (i.e., hours or days of week), demographic information, and filtering criteria.

The registry device APIs 415 may represent distributed and scalable software services running in the public or private could that are responsible for interfacing directly with hardware devices such as the user device 400.

The registry enforcement 440 may represent distributed and scalable software services running on a public or private cloud. The registry actors 460 may also be distributed and scalable software services running in the public or private cloud.

User device 400 may be an example of, or include aspects of, the corresponding elements described with reference to FIGS. 1-3, and 5. xR warehouse 405 may be an example of, or include aspects of, the corresponding elements described with reference to FIGS. 1-3. xR registry 410 may be an example of, or include aspects of, the corresponding elements described with reference to FIGS. 1-3, 5, and 6.

xR registry 410 may include registry device APIs 415, registry enforcement 440, and registry actors 460. Registry device APIs 415 may be an example of, or include aspects of, the corresponding elements described with reference to FIG. 2. Registry device APIs 415 may include transaction service 420, RWDRS 425, localizer service 430, and identity service 435. Transaction service 420, RWDRS 425, localizer service 430, and identity service 435 may be examples of, or include aspects of, the corresponding elements described with reference to FIG. 2.

Registry enforcement 440 may include rules 445, rights 450, and compliance and enforcement service 455. rules 445 may be an example of, or include aspects of, the corresponding elements described with reference to FIGS. 2, 3, and 5. Rights 450 and compliance and enforcement service 455 may be an example of, or include aspects of, the corresponding elements described with reference to FIG. 2.

Registry actors 460 may include governing entity 465, owner 470, and sublicensee 475. Governing entity 465 may be an example of, or include aspects of, the corresponding elements described with reference to FIGS. 2 and 3.

Owner 470 may be an example of, or include aspects of, the corresponding elements described with reference to FIGS. 2, 3, and 5. Sublicensee 475 may be an example of, or include aspects of, the corresponding elements described with reference to FIGS. 2 and 3.

Figure 5:
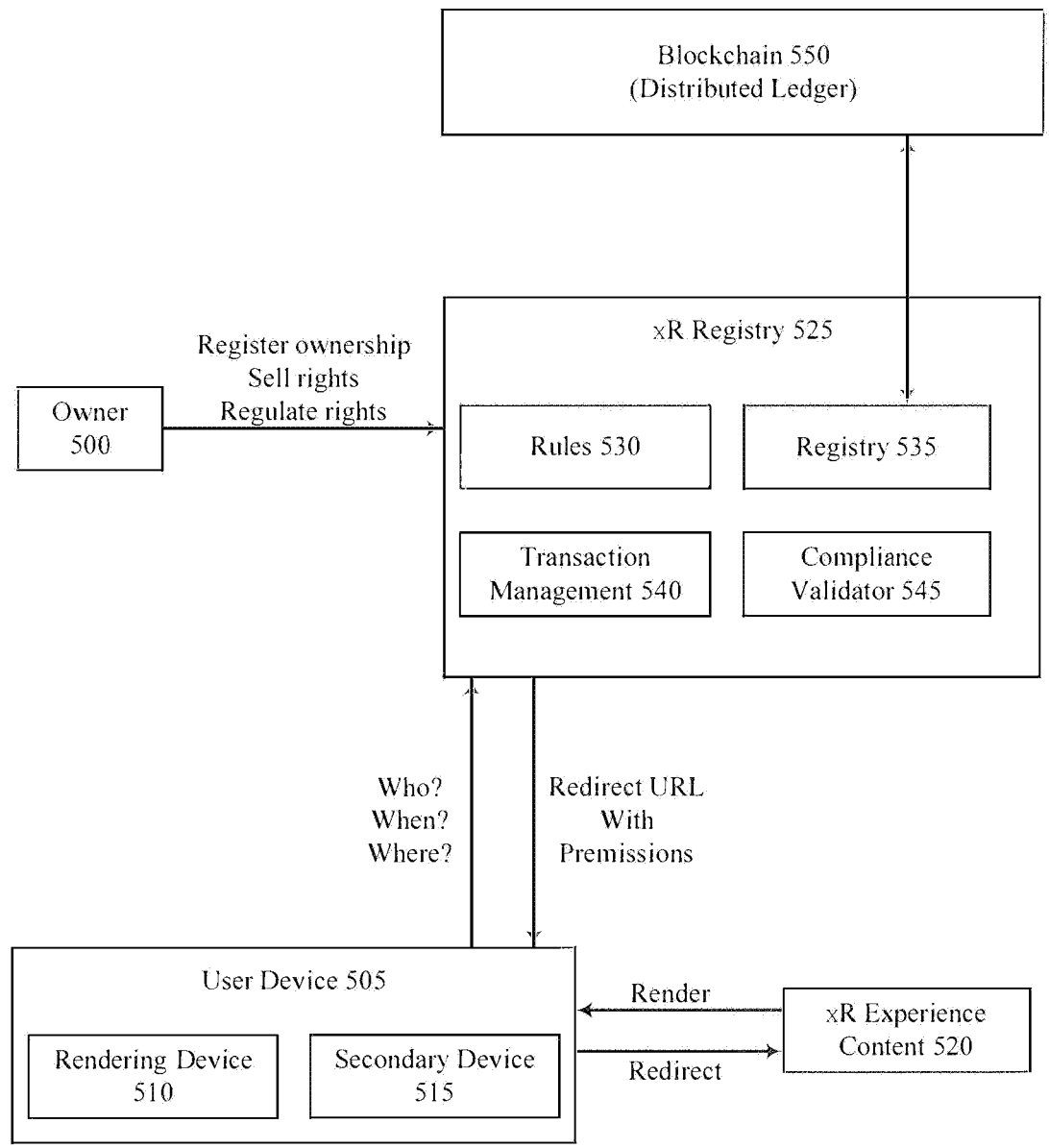
FIG. 5 shows an example of a blockchain distributed ledger registry in accordance with aspects of the present disclosure.

FIG. 5 shows an example of a blockchain 550 distributed ledger registry 535 in accordance with aspects of the present disclosure. The example shown includes owner 500, user device 505, xR experience 520, xR registry 525, and blockchain 550.

The xR property policies and rights (including xR real estate, property rights, etc.) may be managed in a similar manner in a blockchain system as in existing property recordation schemes. However, rather than utilizing a centralized organizations or physical records for this, the blockchain 550 (or distributed ledger) will be leveraged to create immutable records for storing and memorializing such data (including ownership of property rights and real estate). Appropriate actors, especially property and object owners 500, will have the same control over their xR assets and property and may be able to generate revenue (as well as track and monitor) from virtual property or objects in the same way they do with physical assets.

In addition to decentralization, leveraging the distributed ledger nature of blockchain 550 may also provide the following benefits for xR property ownership: efficient transaction speed, increased trust and fraud reduction (via the removal of a central authority), and liquidity via tokenization (i.e., partial property ownership via tokens).

Owner 500 may be an example of, or include aspects of, the corresponding elements described with reference to FIGS. 2-4. User device 505 may be an example of, or include aspects of, the corresponding elements described with reference to FIGS. 1-4.

User device 505 may include rendering device 510 and secondary device 515. Rendering device 510 and secondary device 515 may be an example of, or include aspects of, the corresponding elements described with reference to FIG. 1.

xR experience 520 may be an example of, or include aspects of, the corresponding elements described with reference to FIGS. 1-3. xR registry 525 may be an example of, or include aspects of, the corresponding elements described with reference to FIGS. 1-4, and 6. xR registry 525 may include rules 530, registry 535, transaction management 540, and compliance validator 545.

Rules 530 may be an example of, or include aspects of, the corresponding elements described with reference to FIGS. 2-4. Blockchain 550 may be an example of, or include aspects of, the corresponding elements described with reference to FIG. 6.

Figure 6:
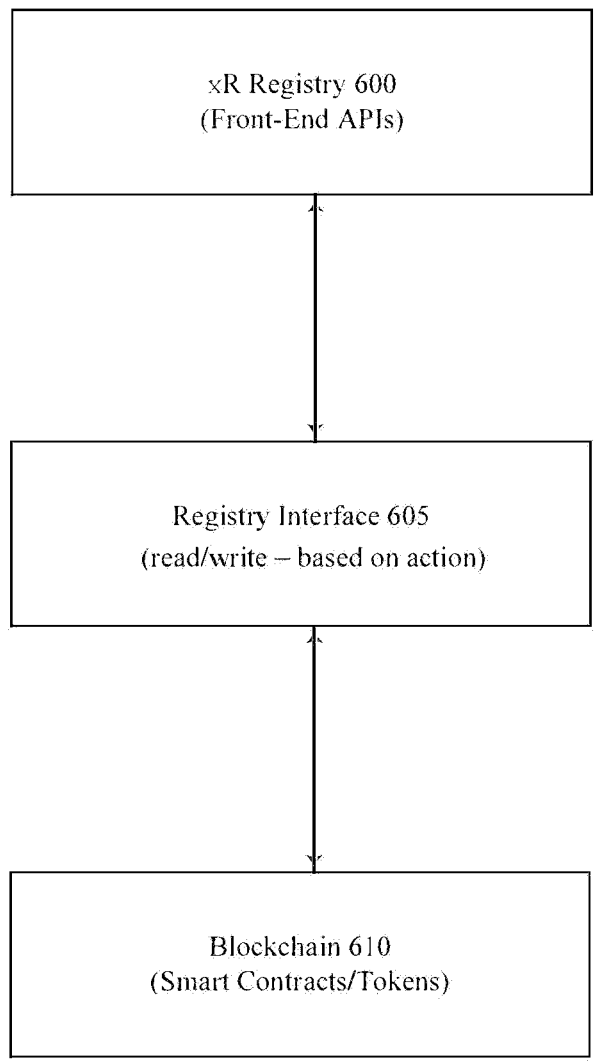
FIG. 6 shows an example of an xR Registry blockchain interface system in accordance with aspects of the present disclosure.

FIG. 6 shows an example of an xR registry 600 blockchain 610 interface system in accordance with aspects of the present disclosure. The example shown includes xR registry 600, registry interface 605, and blockchain 610.

The xR registry 600 may include a front end and APIs. The registry interface 605 may include one or more systems for performing read and write operations to the blockchain 610. xR Registry 600 may be an example of, or include aspects of, the corresponding elements described with reference to FIGS. 1-5.

The blockchain 610 may be Ethereum, EOS, or another blockchain 610. One or more smart contracts for the xR registry 600 may reside on the blockchain 610, including smart contracts that represent official property rights. Tokenized properties may also reside on the blockchain 610. Blockchain 610 may be an example of, or include aspects of, the corresponding elements described with reference to FIG. 5.

Figure 7:
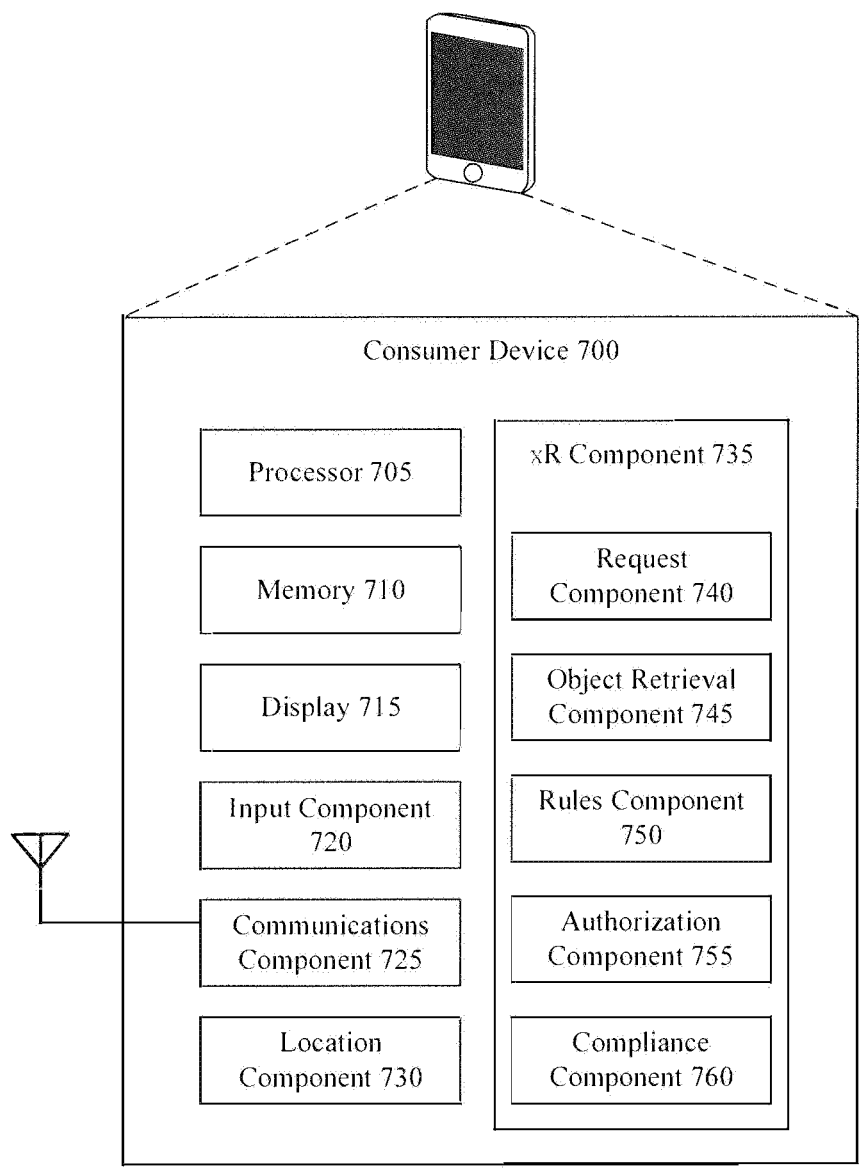
FIG. 7 shows an example of consumer device in accordance with aspects of the present disclosure.

FIG. 7 shows an example of consumer device 700 in accordance with aspects of the present disclosure. Consumer device 700 may include processor 705, memory 710, display 715, input component 720, communications component 725, location component 730, and xR component 735.

Memory 710 may store a digital record of applying the one or more rules for said portions of three-dimensional space to all said one or more objects corresponding to said portions of three-dimensional space.

Location component 730 may identify a real-time location of the user, and wherein said plurality of rules includes rules configured to apply based on the user's location. Location component 730 may also track a gaze of the user, and wherein said plurality of rules includes rules configured to apply based on a direction of the user's gaze. Location component 730 may also track a relative velocity of the user, and wherein said plurality of rules includes rules configured to apply based on a velocity of the user relative to the three-dimensional space.

xR component 735 may include request component 740, object retrieval component 745, rules component 750, authorization component 755, and compliance component 760.

Request component 740 may receive a request to render a volume of three-dimensional space. In some examples, the rendering comprises one or more of display, audio, smell, touch or taste. Request component 740 may also receive a request to create one or more objects for said volume of three-dimensional space of said plurality of objects, wherein within the request includes a plurality of rules for said volume of three-dimensional space. In some examples, said volume of three-dimensional space includes at least one selected from the group of a person, an animal, a physical location, and an inanimate object.

In some examples, said receiving a request to render a volume of three-dimensional space also includes receiving an orientation to said volume of three-dimensional space wherein said orientation includes at least one selected from the group of a proximity distance, a position, a placement, a perimeter, a field of view, a viewing angle, a relative velocity, a viewing validity, and a viewing time.

In some examples, the virtual three-dimensional space includes portions designated as private, and wherein said plurality of rules includes rules applied to rendered portions of virtual three-dimensional space when the rendered portions are designated as private. In some examples, the virtual three-dimensional space includes portions designated as public, and wherein said plurality of rules includes rules applied to rendered portions of virtual three-dimensional space when the rendered portions are designated as public. In some examples, the request to render a volume of a three-dimensional space includes rendering the three-dimensional space for a user interacting with the system.

Object retrieval component 745 may retrieve one or more objects for said volume of three-dimensional space of said plurality of objects from said first system. In some examples, said volume of three-dimensional space includes at least one selected from the group of a person, an animal, a physical location, and an inanimate object.

In some examples, the one or more objects is a plurality of objects, and said plurality of rules includes rules configured to apply when a first object of the plurality of objects is within an orientation of a second object of the plurality of objects wherein said orientation includes at least one selected from the group of a proximity distance, a position, a placement, a perimeter, a field of view, a viewing angle, a relative velocity, a viewing validity, and a viewing time.

In some examples, the one or more objects is a plurality of objects, and said plurality of rules includes rules configured to apply based on an orientation between a first object of the plurality of objects and second object of the plurality of objects changing over time wherein said orientation includes at least one selected from the group of a proximity distance, a position, a placement, a perimeter, a field of view, a viewing angle, a relative velocity, a viewing validity, and a viewing time.

Rules component 750 may retrieve one or more rules of said plurality of rules associated with portions of the three-dimensional space included in said volume of three-dimensional space. Rules component 750 may also apply said one or more rules for said portions of three-dimensional space to all said one or more objects corresponding to said portions of three-dimensional space. Rules component 750 may also deactivate any of said one or more objects that do not satisfy said one or more rules when said one or more rules are applied. Rules component 750 may also activate any of said one or more objects that do satisfy said one or more rules when said one or more rules are applied. Rules component 750 may also maintain a registry of ownership.

In some examples, said plurality of rules includes at least one selected from the group of a government rule, a regulation rule, a zoning rule, a law rule, a compliance rule, a government rights rule, and an ordinance rule. In some examples, said plurality of rules are configured to include a time of day schedule defining when at least one of said plurality of rules is applicable and/or inapplicable. In some examples, said plurality of rules are configured to include a user profile defining whether at least one of said plurality of rules is applicable to at least one of said users.

In some examples, said plurality of rules are configured to include at least one prior user characteristic defining when each of said plurality of rules is applicable based on one or more prior users accessing said volume of three-dimensional space. In some examples, said plurality of rules are configured to include simultaneous viewing user characteristic defining when each of said plurality of rules is applicable based on other users who have access to said volume of three-dimensional space.

In some examples, said plurality of rules utilize said orientation to said volume of three-dimensional space. In some examples, said plurality of rules includes rules for assigning a defined volume of three-dimensional space to an owner. In some examples, said plurality of rules includes rules for the owned volume of space wherein the rules for the owned volume of space are determined by the owner of the volume.

In some examples, said plurality of rules includes rules allowing the owner to enter into an agreement with another entity wherein the agreement includes allowing the entity to have at least partial control of a portion of the three-dimensional space wherein said entity includes at least one selected from the group of a person, a group of persons, a government entity, and a business. In some examples, the plurality of rules includes rules governing the at least the partial control of the portion of three-dimensional space.

In some examples, the plurality of rules includes rules set by the owner determining the extent of the partial control. In some examples, said plurality of rules includes rules preventing objects unauthorized by the owner being displayed in the assigned volume of three-dimensional space. In some examples, the ownership is transferable.

In some examples, the ownership of the three-dimensional space is related to ownership of an associated physical space. In some examples, the ownership of the three-dimensional space is related to ownership of an associated virtual space. In some examples, said plurality of rules are configured to include rules set by an adult wherein the adult authorized to set parental control rules for a child. In some examples, said parental controls are based on at least one personal characteristic of the child.

In some examples, said plurality of rules includes rules for obscuring the identity of a person in the portions of three-dimensional space. In some examples, said plurality of rules includes rules for preventing rendering of personal information of a person. In some examples, said plurality of rules includes rules governing which objects can be rendered in association with a person.

In some examples, the rules for governing which objects can be rendered in association with a person include rules defining inappropriate content and rules for preventing rendering of objects with inappropriate content. In some examples, the zoning designations include one or more of residential, commercial, industrial, government, agricultural, public, and recreational.

In some examples, the zoning designations include one or more of residential, commercial, industrial, government, agricultural, public, and recreational. In some examples, said plurality of rules includes rules for providing a real-time alert in the three-dimensional space. In some examples, the real-time alert is an emergency alert.

In some examples, said plurality of rules includes rules configured to apply when the user is operating a vehicle. In some examples, the user is associated with an additional user, and the plurality of said rules includes rules configured to apply when an identifier of the additional user located in the three-dimensional space is within an orientation of the user wherein said orientation includes at least one selected from the group of a proximity distance, a position, a placement, a perimeter, a field of view, a viewing angle, a relative velocity, a viewing validity, and a viewing time.

In some examples, said plurality of rules includes rules configured to apply based on a viewing angle between the user's gaze and one of the one or more objects. In some examples, said plurality of rules includes rules configured to apply based on a duration of the user's gaze, as detected by, for example a camera system monitoring the user's eye movements in combination with, e.g., coupled to, a vision system interpreting output of the camera system in order to detect the user's eye movements.

In some examples, said plurality of rules includes rules configured to apply when the user is within an orientation of one object in the rendered volume of space wherein said orientation includes at least one selected from the group of a proximity distance, a position, a placement, a perimeter, a field of view, a viewing angle, a relative velocity, a viewing validity, and a viewing time. In some examples, said plurality of rules includes rules configured to apply at a first time based on a location of the user at a different second time. In some examples, said plurality of rules includes rules for determining resolution of the one or more objects.

In some examples, said plurality of rules includes rules for the owned volume of space wherein the rules for the owned volume of space are determined by the owner of the space. In some examples, said plurality of rules includes rules allowing the owner of the space to enter into an agreement with another entity, wherein the agreement includes allowing the entity to have at least partial control of a portion of the three-dimensional space wherein said entity includes at least one selected from the group of a person, a group of persons, a government entity, and a business.

In some examples, the plurality of rules includes rules governing the at least the partial control of the portion of three-dimensional space. In some examples, the plurality of rules includes rules set by the owner determining the extent of the partial control. In some examples, said plurality of rules includes rules preventing objects unauthorized by the owner from being placed in the assigned volume of three-dimensional space.

In some examples, the ownership of the three-dimensional space is related to ownership of an associated physical space. In some examples, each object has an owner. In some examples, the owner of the object receives economic compensation in response to a request for the object.

Authorization component 755 may verify permission to create placement in the system for said volume of three-dimensional space of said plurality of objects. Compliance component 760 may monitor the entity for compliance with the rules.

In some examples, said permission includes verification of creation rights of said volume of three-dimensional space. In some examples, said creation rights includes ownership of a physical three-dimensional space associated with the volume of three-dimensional space. In some examples, the verify permission includes determining if the owner of the object has licensed the object to a different entity. In some examples, the verify permission step includes contacting a third-party enforcement system. In some examples, the verify permission step includes sending data generated by the second system to a third-party system. In some examples, the third-party system is associated with a government entity.

Figure 8:
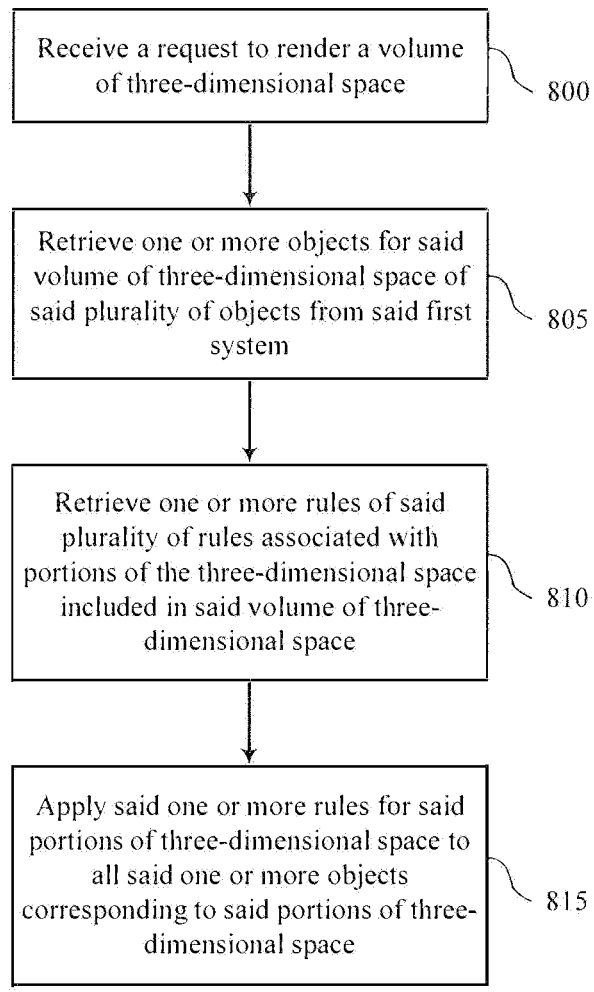
FIGS. 8 through 18 show examples of a process for authorizing rendering of objects in three-dimensional spaces in accordance with aspects of the present disclosure.

FIG. 8 shows an example of a process for authorizing rendering of objects in three-dimensional spaces in accordance with aspects of the present disclosure. In some examples, these operations may be performed by a processor executing a set of codes to control functional elements of an apparatus. Additionally, or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, a system may receive a request to render a volume of three-dimensional space. In some cases, the operations of this step may refer to, or be performed by, a request component as described with reference to FIG. 7.

At step 805, a system may retrieve one or more objects for said volume of three-dimensional space of said plurality of objects from said first system. In some cases, the operations of this step may refer to, or be performed by, an object retrieval component as described with reference to FIG. 7.

At step 810, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 815, a system may apply said one or more rules for said portions of three-dimensional space to all said one or more objects corresponding to said portions of three-dimensional space. In some cases, the operations of this step may refer to, or be performed by, a rules component as described with reference to FIG. 7.

Figure 9:
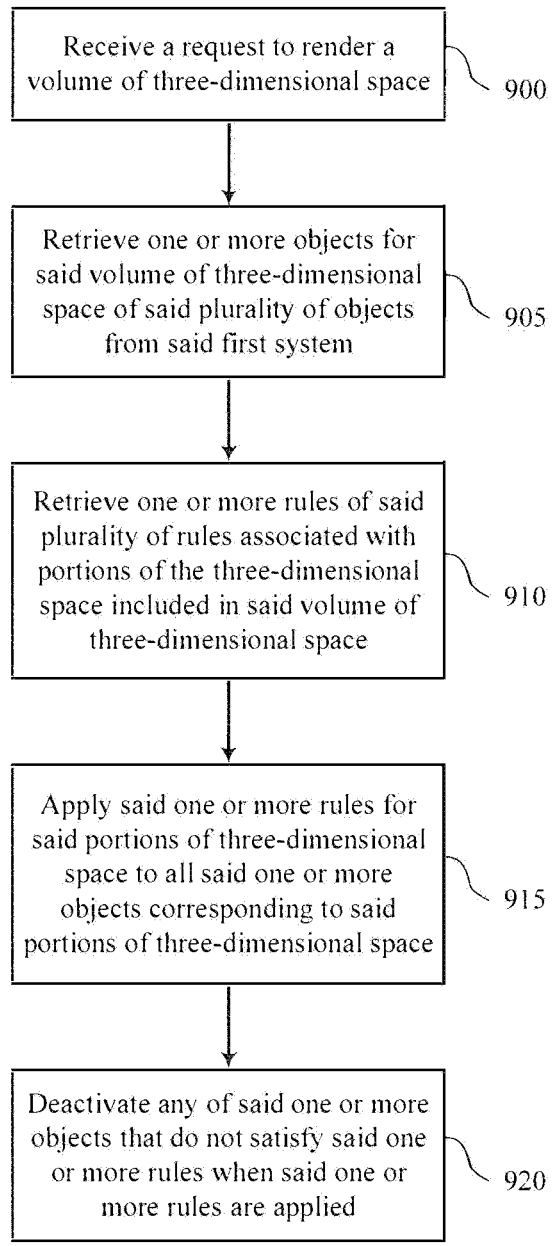

FIG. 9 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 900, a system may receive a request to render a volume of three-dimensional space. In some cases, the operations of this step may refer to, or be performed by, a request component as described with reference to FIG. 7.

At step 905, a system may retrieve one or more objects for said volume of three-dimensional space of said plurality of objects from said first system. In some cases, the operations of this step may refer to, or be performed by, an object retrieval component as described with reference to FIG. 7.

At step 910, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 915, a system may apply said one or more rules for said portions of three-dimensional space to all said one or more objects corresponding to said portions of three-dimensional space. In some cases, the operations of this step may refer to, or be performed by, a rules component as described with reference to FIG. 7.

At step 920, a system may deactivate any of said one or more objects that do not satisfy said one or more rules when said one or more rules are applied. In some cases, the operations of this step may refer to, or be performed by, a rules component as described with reference to FIG. 7.

Figure 10:
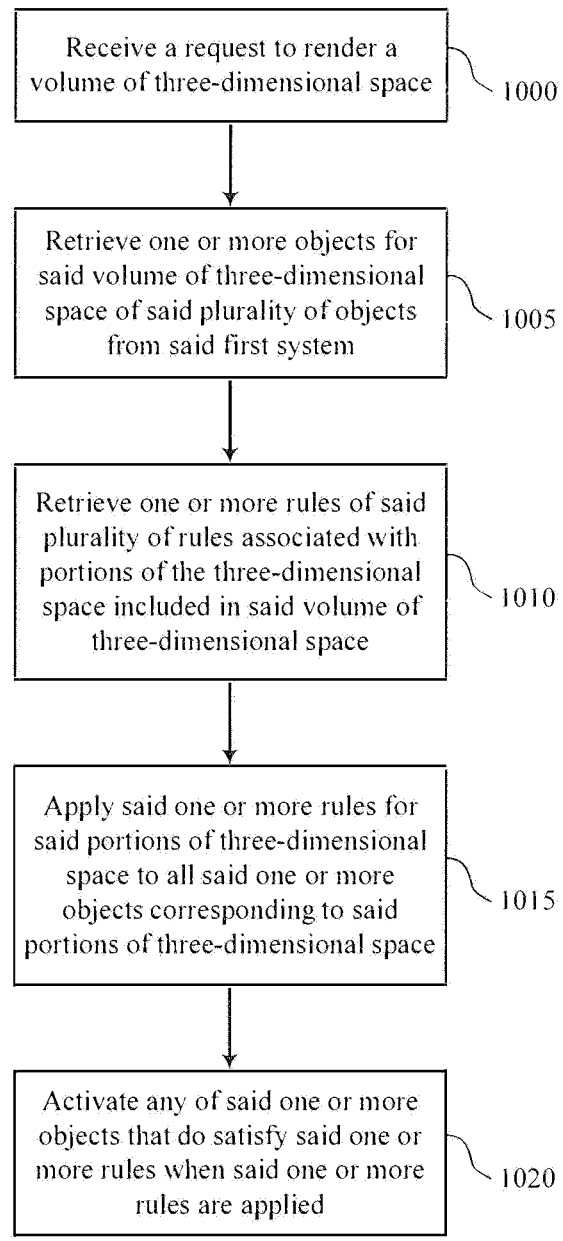

FIG. 10 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1000, a system may receive a request to render a volume of three-dimensional space. In some cases, the operations of this step may refer to, or be performed by, a request component as described with reference to FIG. 7.

At step 1005, a system may retrieve one or more objects for said volume of three-dimensional space of said plurality of objects from said first system. In some cases, the operations of this step may refer to, or be performed by, an object retrieval component as described with reference to FIG. 7.

At step 1010, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 1015, a system may apply said one or more rules for said portions of three-dimensional space to all said one or more objects corresponding to said portions of three-dimensional space. In some cases, the operations of this step may refer to, or be performed by, a rules component as described with reference to FIG. 7.

At step 1020, a system may activate any of said one or more objects that do satisfy said one or more rules when said one or more rules are applied. In some cases, the operations of this step may refer to, or be performed by, a rules component as described with reference to FIG. 7.

Figure 11:
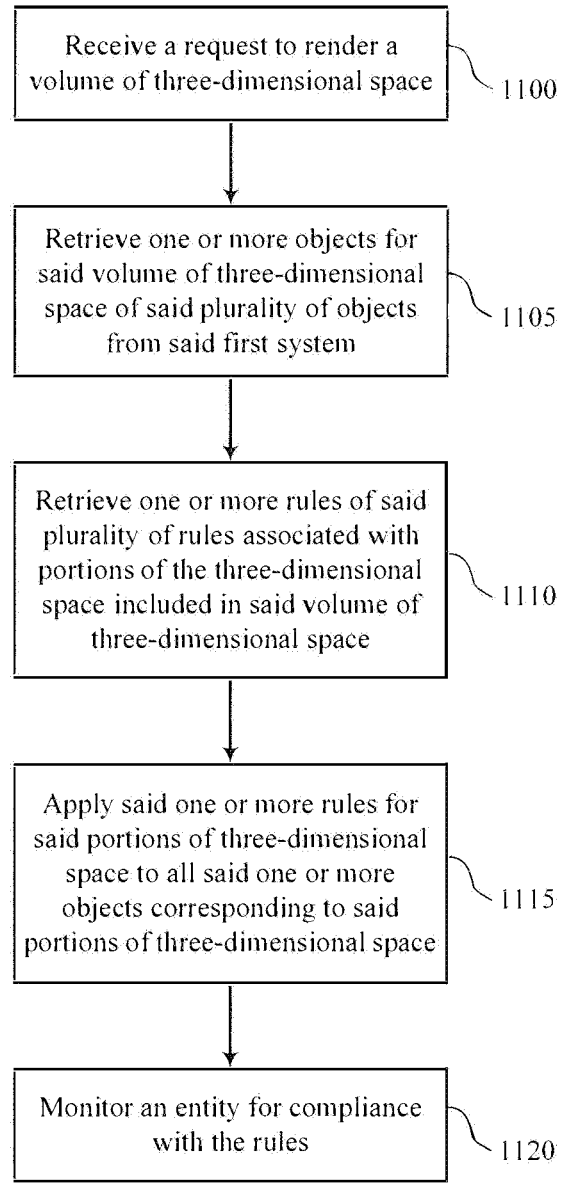

FIG. 11 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1100, a system may receive a request to render a volume of three-dimensional space. In some cases, the operations of this step may refer to, or be performed by, a request component as described with reference to FIG. 7.

At step 1105, a system may retrieve one or more objects for said volume of three-dimensional space of said plurality of objects from said first system. In some cases, the operations of this step may refer to, or be performed by, an object retrieval component as described with reference to FIG. 7.

At step 1110, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 1115, a system may apply said one or more rules for said portions of three-dimensional space to all said one or more objects corresponding to said portions of three-dimensional space. In some cases, the operations of this step may refer to, or be performed by, a rules component as described with reference to FIG. 7.

At step 1120, a system may monitor an entity for compliance with the rules. In some cases, the operations of this step may refer to, or be performed by, a compliance component as described with reference to FIG. 7.

Figure 12:
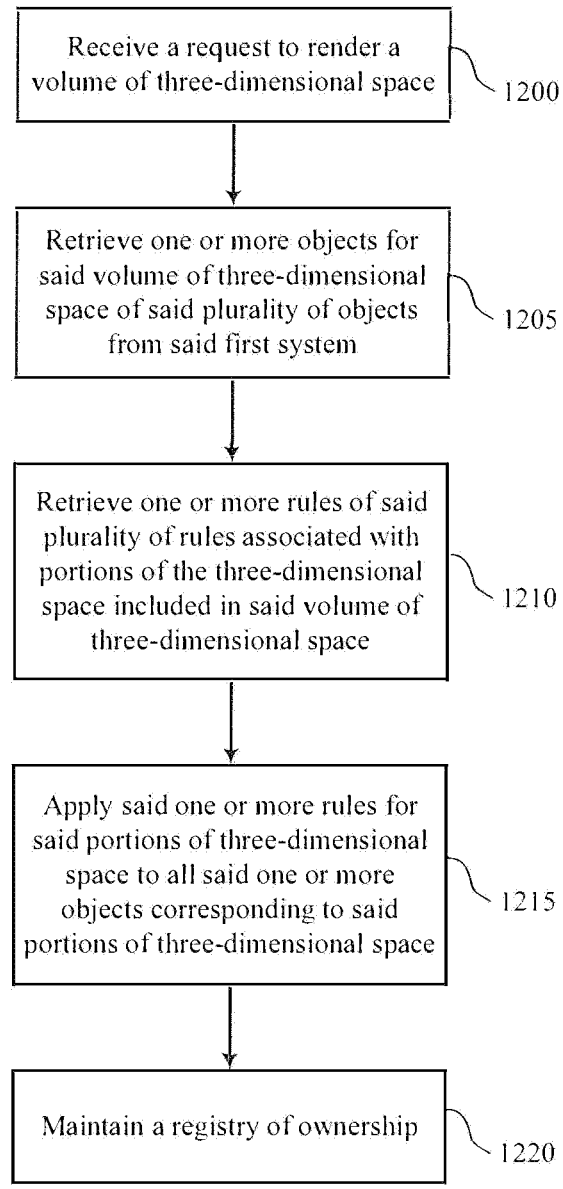

FIG. 12 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1200, a system may receive a request to render a volume of three-dimensional space. In some cases, the operations of this step may refer to, or be performed by, a request component as described with reference to FIG. 7.

At step 1205, a system may retrieve one or more objects for said volume of three-dimensional space of said plurality of objects from said first system. In some cases, the operations of this step may refer to, or be performed by, an object retrieval component as described with reference to FIG. 7.

At step 1210, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 1215, a system may apply said one or more rules for said portions of three-dimensional space to all said one or more objects corresponding to said portions of three-dimensional space. In some cases, the operations of this step may refer to, or be performed by, a rules component as described with reference to FIG. 7.

At step 1220, a system may maintain a registry of ownership. In some cases, the operations of this step may refer to, or be performed by, a rules component as described with reference to FIG. 7.

Figure 13:
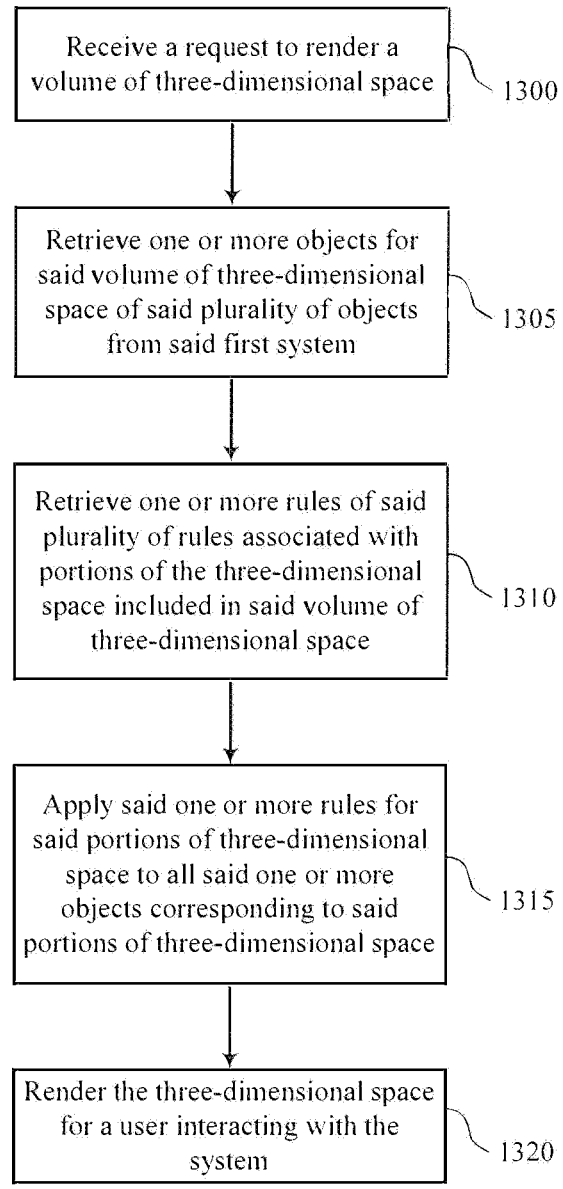

FIG. 13 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1300, a system may receive a request to render a volume of three-dimensional space. In some cases, the operations of this step may refer to, or be performed by, a request component as described with reference to FIG. 7.

At step 1305, a system may retrieve one or more objects for said volume of three-dimensional space of said plurality of objects from said first system. In some cases, the operations of this step may refer to, or be performed by, an object retrieval component as described with reference to FIG. 7.

At step 1310, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 1315, a system may apply said one or more rules for said portions of three-dimensional space to all said one or more objects corresponding to said portions of three-dimensional space. In some cases, the operations of this step may refer to, or be performed by, a rules component as described with reference to FIG. 7.

At step 1320, a system may render the three-dimensional space for a user interacting with the system. In some cases, the operations of this step may refer to, or be performed by, a request component as described with reference to FIG. 7.

Figure 14:
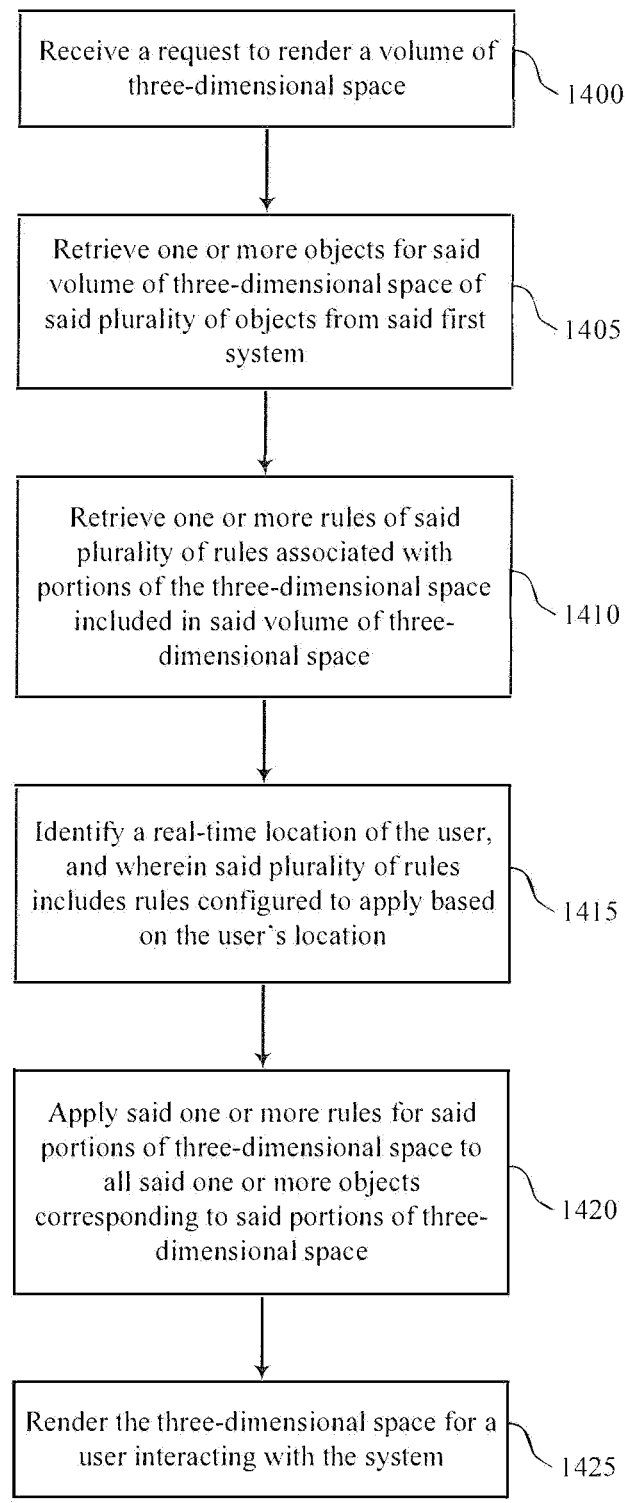

FIG. 14 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1400, a system may receive a request to render a volume of three-dimensional space. In some cases, the operations of this step may refer to, or be performed by, a request component as described with reference to FIG. 7.

At step 1405, a system may retrieve one or more objects for said volume of three-dimensional space of said plurality of objects from said first system. In some cases, the operations of this step may refer to, or be performed by, an object retrieval component as described with reference to FIG. 7.

At step 1410, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 1415, a system may identify a real-time location of the user, and wherein said plurality of rules includes rules configured to apply based on the user's location. In some cases, the operations of this step may refer to, or be performed by, a location component as described with reference to FIG. 7.

At step 1420, a system may apply said one or more rules for said portions of three-dimensional space to all said one or more objects corresponding to said portions of three-dimensional space. In some cases, the operations of this step may refer to, or be performed by, a rules component as described with reference to FIG. 7.

At step 1425, a system may render the three-dimensional space for a user interacting with the system. In some cases, the operations of this step may refer to, or be performed by, a request component as described with reference to FIG. 7.

Figure 15:
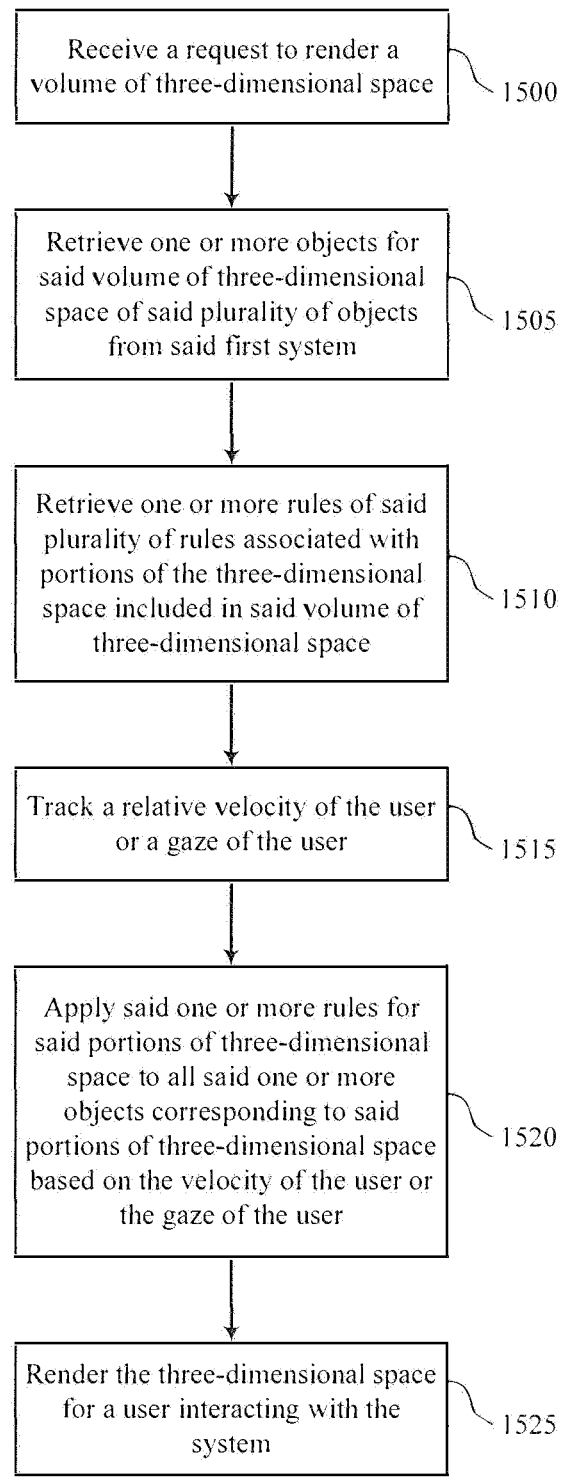

FIG. 15 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1500, a system may receive a request to render a volume of three-dimensional space. In some cases, the operations of this step may refer to, or be performed by, a request component as described with reference to FIG. 7.

At step 1505, a system may retrieve one or more objects for said volume of three-dimensional space of said plurality of objects from said first system. In some cases, the operations of this step may refer to, or be performed by, an object retrieval component as described with reference to FIG. 7.

At step 1510, a system may retrieve one or more rules of said plurality of rules associated with portions of the three-dimensional space included in said volume of three-dimensional space. In some cases, the operations of this step may refer to, or be performed by, a rules component as described with reference to FIG. 7.

At step 1515, a system may track a relative velocity of the user or a gaze of the user. In some cases, the operations of this step may refer to, or be performed by, a location component as described with reference to FIG. 7.

At step 1520, a system may apply said one or more rules for said portions of three-dimensional space to all said one or more objects corresponding to said portions of three-dimensional space based on the velocity of the user or the gaze of the user. In some cases, the operations of this step may refer to, or be performed by, a rules component as described with reference to FIG. 7.

At step 1525, a system may render the three-dimensional space for a user interacting with the system. In some cases, the operations of this step may refer to, or be performed by, a request component as described with reference to FIG. 7.

Figure 16:
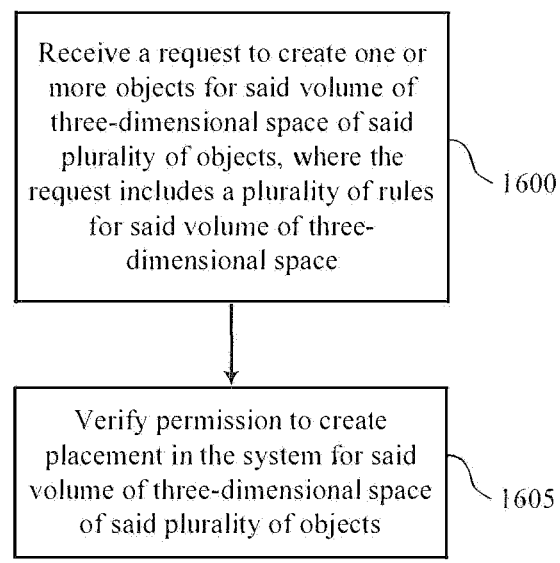

FIG. 16 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1600, a system may receive a request to create one or more objects for said volume of three-dimensional space of said plurality of objects, wherein within the request includes a plurality of rules for said volume of three-dimensional space. In some cases, the operations of this step may refer to, or be performed by, a request component as described with reference to FIG. 7.

At step 1605, a system may verify permission to create placement in the system for said volume of three-dimensional space of said plurality of objects. In some cases, the operations of this step may refer to, or be performed by, an authorization component as described with reference to FIG. 7.

Figure 17:
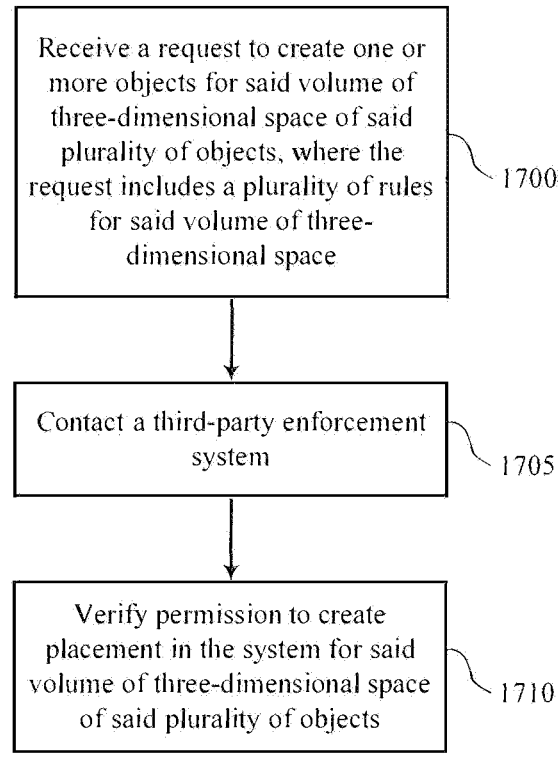

FIG. 17 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1700, a system may receive a request to create one or more objects for said volume of three-dimensional space of said plurality of objects, wherein within the request includes a plurality of rules for said volume of three-dimensional space. In some cases, the operations of this step may refer to, or be performed by, a request component as described with reference to FIG. 7.

At step 1705, a system may contact a third-party enforcement system. In some cases, the operations of this step may refer to, or be performed by, an authorization component as described with reference to FIG. 7.

At step 1710, a system may verify permission to create placement in the system for said volume of three-dimensional space of said plurality of objects. In some cases, the operations of this step may refer to, or be performed by, an authorization component as described with reference to FIG. 7.

Figure 18:
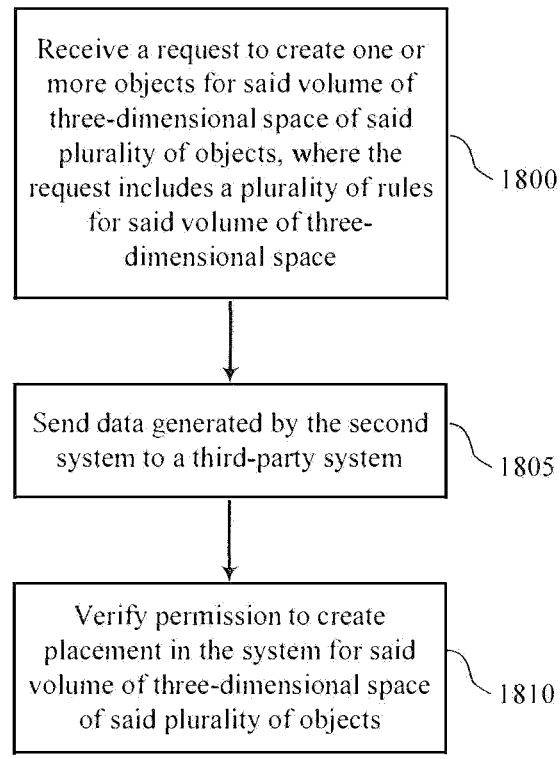

FIG. 18 shows an example of a process for authorizing rendering of objects in three-dimensional spaces in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1800, a system may receive a request to create one or more objects for said volume of three-dimensional space of said plurality of objects, wherein within the request includes a plurality of rules for said volume of three-dimensional space. In some cases, the operations of this step may refer to, or be performed by, a request component as described with reference to FIG. 7.

At step 1805, a system may send data generated by the second system to a third-party system. In some cases, the operations of this step may refer to, or be performed by, an authorization component as described with reference to FIG. 7.

At step 1810, a system may verify permission to create placement in the system for said volume of three-dimensional space of said plurality of objects. In some cases, the operations of this step may refer to, or be performed by, an authorization component as described with reference to FIG. 7.

This disclosure is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for authorizing rendering of objects in three-dimensional spaces having a first system comprising a first processor and a first memory, said first system defining a virtual three-dimensional space including placement of a plurality of objects in the three-dimensional space, the system comprising:
    a second system comprising a second processor and a second memory, said second system defining said virtual three-dimensional space including a plurality of rules associated with portions of the three-dimensional space; and
    a device, the device comprising a third processor and a third memory, coupled to the first system and the second system, the device comprising:
        a location sensor providing a location or an orientation for determining a volume of three-dimensional space to be requested;
        a rendering device configured to render one or more objects from said volume of three-dimensional space having been authorized;
        a communications device configured to provide at least one request selected from the group of requests consisting of: a request to render said volume of three-dimensional space, a request to retrieve said plurality of rules for said volume of three-dimensional space, a request to retrieve said plurality of one or more objects for said volume of three-dimensional space and combinations thereof;
        the third processor configured to perform the following steps:
            receive said request to render said volume of three-dimensional space;
            retrieve said one or more objects for said volume of three-dimensional space of said plurality of objects from said first system;
            retrieve one or more rules of said plurality of rules associated with portions of the three-dimensional space included in said volume of three-dimensional space; and apply said one or more rules for said portions of three-dimensional space to all said one or more objects corresponding to said portions of three-dimensional space and one of authorize or deauthorize any of said one or more objects that satisfy said one or more rules, or one of authorize or deauthorize any of said one or more objects that do not satisfy said one or more rules.

2. The system in claim 1 wherein said communications device is configured to receive said at least one request over a network.

3. The system in claim 2 further comprising:
a storage device configured to store said at least one request having been received over said network.

4. The system of claim 1, wherein: said plurality of rules includes at least one rule for assigning a defined volume of three-dimensional space to an owner.

5. The system of claim 4, wherein said owner is an owner of a physical space.

6. The system of claim 4, wherein said owner is an owner of a virtual space.

7. The system of claim 1, wherein: said plurality of rules include rules set by an adult wherein the adult is authorized to set parental control rules for a child.

8. The system of claim 1, the device being further configured to perform the step of: one of activate or deactivate any of said one or more objects that do not satisfy said one or more rules when said one or more rules are applied.

9. The system of claim 1, wherein:
said volume of three-dimensional space includes at least one selected from the group of a person, an animal, a physical location, and an inanimate object.

10. The system of claim 1, wherein:
said plurality of rules includes at least one selected from the group of a government rule, a regulation rule, a zoning rule, a law rule, a compliance rule, a government rights rule, and an ordinance rule.

11. The system of claim 1, wherein:
said plurality of rules are configured to include a time of day schedule defining when at least one of said plurality of rules is applicable and/or inapplicable.

12. The system of claim 1, wherein:
said plurality of rules are configured to include a user profile defining whether at least one of said plurality of rules is applicable to at least one of said users.

13. The system of claim 1, wherein:
said plurality of rules are configured to include viewing user characteristic defining when each of said plurality of rules is applicable based on other users who have access to said volume of three-dimensional space.

14. The system of claim 1, wherein:
said receiving the request to render said volume of three-dimensional space also includes receiving an orientation to said volume of three-dimensional space wherein said orientation includes at least one selected from the group of a proximity distance, a position, a placement, a perimeter, a field of view, a viewing angle, a relative velocity, a viewing validity, and a viewing time.

15. The system of claim 1, wherein:
said plurality of rules includes rules for assigning a defined volume of three-dimensional space to an owner and preventing objects unauthorized by the owner being rendered in an assigned volume of three-dimensional space.

16. The system of claim 1, wherein:
said plurality of rules includes rules for at least one selected from the group of a rule preventing rendering of personal information of a person, a rule obscuring an identity of a person in the portions of three-dimensional space.

17. The system of claim 1, wherein:
said plurality of rules includes rules governing which objects can be rendered in association with at least one selected from the group of a person, an animal, a physical location, and an inanimate object.

18. The system of claim 1, wherein:
the request to render a volume of a three-dimensional space includes rendering the three-dimensional space for a user interacting with the system.

19. The system of claim 1, wherein:
the one or more objects is a plurality of objects, and said plurality of rules includes rules configured to apply during at least one or more moments in time when a first object of the plurality of objects is within an orientation of a second object of the plurality of objects wherein said orientation includes at least one selected from the group of a proximity distance, a position, a placement, a perimeter, a field of view, a viewing angle, a relative velocity, a viewing validity, and a viewing time.

20. A system for authorizing rendering of objects in three-dimensional spaces having a first system comprising a first processor and a first memory, said first system defining a virtual three-dimensional space including placement of a plurality of objects in the three-dimensional space, the system comprising:
a second system comprising a second processor and a second memory, said second system defining said virtual three-dimensional space including a plurality of rules associated with portions of the three-dimensional space; and
a device, the device comprising a third processor and a third memory, coupled to the first system and the second system, the device comprising:
a location sensor providing a location or an orientation for determining a volume of three-dimensional space to be requested;
a rendering device configured to render one or more objects from said volume of three-dimensional space having been authorized;
a communications device configured to provide at least one request selected from the group of requests consisting of: a request to render said volume of three-dimensional space, a request to retrieve said plurality of rules, and a request to retrieve said plurality of one or more objects for said volume of three-dimensional space;
the third processor configured to perform the following steps:
receive the request to render said volume of three-dimensional space;
retrieve one or more objects for said volume of three-dimensional space of said plurality of objects from said first system;
retrieve one or more rules of said plurality of rules associated with portions of the three-dimensional space included in said volume of three-dimensional space; and
apply said one or more rules for said portions of three-dimensional space to all said one or more objects corresponding to said portions of three-dimensional space, said one or more rules includes rules for assigning a defined volume of three-dimensional space to an owner and preventing objects not authorized by the owner from being rendered in an assigned volume of three-dimensional space, or allowing objects authorized by the owner to be rendered in the assigned volume of three-dimensional space.

\* \* \* \* \*

UNITED STATES PATENT AND TRADEMARK OFFICE
CERTIFICATE OF CORRECTION

| | | |
|---|---|---|
| PATENT NO. | : 11,580,243 B2 | Page 1 of 1 |
| APPLICATION NO. | : 17/096832 | |
| DATED | : February 14, 2023 | |
| INVENTOR(S) | : Todd Collart | |

It is certified that error appears in the above-identified patent and that said Letters Patent is hereby corrected as shown below:

On the Title Page

In Item (71), under "Applicant", in Column 1, Line 1, delete "Todd Collart" and insert -- Todd R. Collart --, therefor.

In Item (72), under "Inventor", in Column 1, Line 1, delete "Todd Collart" and insert -- Todd R. Collart --, therefor.

Signed and Sealed this
Eleventh Day of June, 2024

Katherine Kelly Vidal
*Director of the United States Patent and Trademark Office*